United States Patent
Le Bars et al.

(10) Patent No.: US 9,577,734 B2
(45) Date of Patent: Feb. 21, 2017

(54) METHOD AND A SYSTEM FOR CONFIGURING A BEAM FORMING ANTENNA IN A COMMUNICATION NETWORK

(75) Inventors: Philippe Le Bars, Thorigne Fouillard (FR); Alain Caillerie, Rennes (FR); Mounir Achir, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 1053 days.

(21) Appl. No.: 13/517,223

(22) PCT Filed: Dec. 21, 2010

(86) PCT No.: PCT/IB2010/003494
§ 371 (c)(1),
(2), (4) Date: Jun. 19, 2012

(87) PCT Pub. No.: WO2011/077257
PCT Pub. Date: Jun. 30, 2011

(65) Prior Publication Data
US 2012/0274513 A1 Nov. 1, 2012

(30) Foreign Application Priority Data
Dec. 21, 2009 (FR) .................... 09 59322

(51) Int. Cl.
*H04B 7/06* (2006.01)
*H04B 7/04* (2006.01)
*H04B 7/02* (2006.01)

(52) U.S. Cl.
CPC ........... *H04B 7/0634* (2013.01); *H04B 7/022* (2013.01); *H04B 7/026* (2013.01); *H04B 7/0417* (2013.01); *H04B 7/0617* (2013.01); *H04B 7/0632* (2013.01)

(58) Field of Classification Search
CPC ..... H04B 7/026; H04B 7/0417; H04B 7/0617; H04B 7/0632; H04B 7/0634; H04B 7/0626
See application file for complete search history.

(56) References Cited

U.S. PATENT DOCUMENTS

| | | | |
|---|---|---|---|
| 1,738,522 | A | 12/1919 | Campbell |
| 3,368,168 | A | 2/1968 | Lucky |

(Continued)

FOREIGN PATENT DOCUMENTS

| | | |
|---|---|---|
| CA | 2466371 A1 | 5/2004 |
| WO | 2006088400 A1 | 8/2006 |

(Continued)

OTHER PUBLICATIONS

L. Zheng et al., Optimal diversity-multiplexing tradeoff in multiple antenna channels, in Proc. Allerton Conf. Communications, Control, Computing, Monticello, IL, p. 835-844, Oct. 2001.*
Z. Jingmei et al., Optimal power allocation for multiple-input-multiple-output relaying system, IEEE Vehicular Technology Conference, vol. 2, p. 1405-1409, 2004.*

(Continued)

*Primary Examiner* — Gregory C Issing
*Assistant Examiner* — Fred H Mull
(74) *Attorney, Agent, or Firm* — Canon U.S.A., Inc. IP Division

(57) ABSTRACT

A method of configuring a beam forming antenna in a communication network that comprises a first node where the beam forming antenna is located, second nodes and at least one destination node, communication links being established between said first node and said at least one destination node through at least some of said second nodes. The method comprises: emitting a signal by the beam forming antenna configured with a first set of antenna parameters; the same signal being sent from the first node to several second nodes; obtaining, for a plurality of communication links through which the signal has been sent, at least one physical magnitude representing the distortion caused by each communication link to the signal; aggregating said (Continued)

physical magnitudes of said plurality of communication links; and obtaining a second set of antenna parameters for configuring the beam forming antenna in accordance with said aggregated physical magnitudes.

40 Claims, 19 Drawing Sheets

(56) References Cited

U.S. PATENT DOCUMENTS

| | | | |
|---|---|---|---|
| 6,480,552 B1* | 11/2002 | Tonello | 375/265 |
| 7,151,951 B2 | 12/2006 | Goransson et al. | |
| 7,710,319 B2 | 5/2010 | Nassiri-Toussi et al. | |
| 2002/0161560 A1* | 10/2002 | Abe et al. | 702/196 |
| 2003/0170031 A1 | 9/2003 | Kawabe et al. | |
| 2003/0234741 A1* | 12/2003 | Rogers et al. | 342/463 |
| 2005/0014464 A1* | 1/2005 | Larsson | H04B 7/022 455/11.1 |
| 2005/0053172 A1* | 3/2005 | Heikkila | 375/333 |
| 2005/0129137 A1* | 6/2005 | Yamada et al. | 375/267 |
| 2007/0160014 A1* | 7/2007 | Larsson | H04B 7/022 370/338 |
| 2008/0012764 A1* | 1/2008 | Kang et al. | 342/367 |
| 2008/0026797 A1* | 1/2008 | Nanda et al. | 455/562.1 |
| 2008/0165720 A1* | 7/2008 | Hu et al. | 370/315 |
| 2008/0166975 A1* | 7/2008 | Kim et al. | 455/68 |
| 2009/0143008 A1* | 6/2009 | Hottinen et al. | 455/11.1 |
| 2009/0268657 A1* | 10/2009 | Alexiou et al. | 370/315 |
| 2010/0220601 A1* | 9/2010 | Vermani et al. | 370/248 |

FOREIGN PATENT DOCUMENTS

| | | |
|---|---|---|
| WO | 2007123487 A1 | 11/2007 |
| WO | 2008156067 A1 | 12/2008 |
| WO | 2009095744 A1 | 8/2009 |

OTHER PUBLICATIONS

Mesh network. (1999). In X. Mazda and F. Mazda, Focal dictionary of telecommunications, focal press. London, United Kingdom: Routledge. Retrieved from http://search.credoreference.com/content/entry/bhfidt/mesh_network/0.*

J. Nicholas Laneman, Cooperative Diversity in Wireless Networks: Algorithms and Architectures, Doctor of Philosophy in Electrical Engineering at the Massachusetts Institute of Technology, Sep. 2002.*

Magnitude. (2011). In the Editors of the American Heritage Dictionaries and theEditorsoftheAmericanHeritageDictionaries (Eds.), the American Heritage Dictionary of the English language. Boston, MA: Houghton Mifflin. Retrieved from http://search.credoreference.com/content/entry/hmdictenglang/magnitude/0.*

Number. (2011). In the Editors of the American Heritage Dictionaries and theEditorsoftheAmericanHeritageDictionaries (Eds.), the American Heritage Dictionary of the English language. Boston, MA: Houghton Mifflin. Retrieved from http://search.credoreference.com/content/entry/hmdictenglang/number/0.*

Real number. (2011). In the Editors of the American Heritage Dictionaries and theEditorsoftheAmericanHeritageDictionaries (Eds.), the American Heritage Dictionary of the English language. Boston, MA: Houghton Mifflin. Retrieved from http://search.credoreference.com/content/entry/hmdictenglang/real_number/0.*

S. Zhang et al., Design and Analysis of Multi-Relay Selection for Cooperative Spatial Multiplexing, IEEE International Conference on Communications, p. 1129-1133, May 2008.*

Aggregate. (2015). In the Chambers Dictionary. London, United Kingdom: Chambers Harrap. Retrieved from http://search.credoreference.com/content/entry/chambdict/aggregate/0.*

David J. Love et al., An Overview of Limited Feedback in Wireless Communication Systems, IEEE Journal on Selected Areas in Communications, 26(8):1341-1365, IEEE, New York, NY, Oct. 2008.

Frank Gross, Smart Antenna for Wireless Communication: With Matlab, p. 213, McGraw-Hill Professional, New York, NY; 2005.

* cited by examiner (first node)

(second nodes)

METHOD AND A SYSTEM FOR CONFIGURING A BEAM FORMING ANTENNA IN A COMMUNICATION NETWORK

BACKGROUND OF THE INVENTION

The invention concerns a method and a system for configuring a beam forming antenna in a communication network transporting data.

In communication networks using high transmission frequencies, for example around 60 GHz, the signals require direct transmission, that is to say without reflection, from the source or transmitter. Such a direct transmission is also called Line of Sight (LOS).

Wireless personal area networks (W-PANs) use this kind of frequency. These networks are particularly well suited to A/V (Audio/Vidéo) applications requiring ever higher data bit rates on the order of a few Gigabits per second as well as an increasingly higher quality of services.

However, the power of the directly transmitted signals is attenuated rapidly as they are propagated.

So that the receiver has a sufficient signal to noise ratio, several methods are possible.

Thus recourse may be had to antenna techniques such as combining multiple receiving or transmitting antennas.

It is also possible to use techniques of cooperation between nodes in a network for relaying the signals transmitted.

In a communication network comprising one or more nodes serving as relays and which uses high transmission frequencies, the transmitting antenna must have high gain.

This is because high gain is necessary for being able to transmit a signal to a distant receiver (for example a receiver placed at 10 meters in a radio network where the carrier is 60 GHz) while complying with the constraints on the transmission power, which must remain compatible with the safety of persons.

Since the gain of an antenna is all the greater, the more the antenna is directive (that is to say the narrower the beam), it is necessary to perform a precise aiming of the antenna.

However, such a setting of the antenna requires the knowledge of the direction of arrival of the signal.

In a small network (the distance between the transmitter and the receiver is for example less than 10 meters), a small movement of the transmitter or receiver in a direction that does not correspond to the one to which the lobe or lobes of the antenna extend is liable to cause defective aiming.

In addition, as the useful rate required for transporting data over the network is very high, it is not appropriate to devote time to aiming.

Moreover, forming an antenna lobe at the transmitter from a return of information from a receiver is known from the prior art.

Thus, for example, the U.S. Pat. No. 7,151,951 is known, which discloses a method making provision for using information coming from the nodes of a network for calculating coefficients acting on the amplitude and phase of the signals applied to the elements of an antenna. These coefficients will make it possible to adjust a transmitting antenna capable of generating multiple beams in the context of the 3GPP network.

According to this method, each node in the network transmits a return channel that carries either antenna setting coefficients or information for calculating these coefficients.

However, this method is not entirely satisfactory.

This is because it is not particularly suited to the topology of the network.

Moreover, this method makes it possible to broadcast a message in the network in CDMA mode after having encoded it.

Thus, each receiving node receives a physical signal, each being different from one receiver to another since each signal is orthogonal to the other signals.

This method is therefore not applicable to the reception of the same physical signal at all the receivers.

Furthermore, such a method involves operations at the transmitting node which are costly in terms of resources.

In particular, the orthogonal signals have to be elaborated and encoded using relatively long codes before being transmitted.

Also, the transmission of these signals requires relatively high bandwidth resources.

Another method is known from WO 2006/088400.

According to this method a signal is divided at a transmitting node into substreams which are each transmitted to a different relay node.

The relay nodes provide feedback channel state information to the transmitting node so that the latter adjusts its antenna weighting matrix.

This latter method suffers from the same drawbacks as the former method briefly described above.

BRIEF SUMMARY OF THE INVENTION

The present invention aims to remedy at least one of the above-mentioned drawbacks by proposing a method of configuring a beam forming antenna in a communication network that comprises a first node where the beam forming antenna is located, second nodes and at least one destination node, communication links being established between said first node and said at least one destination node through at least some of said second nodes, characterized in that the method comprises:

- emitting a signal by the beam forming antenna configured with a first set of antenna parameters, the same signal being sent from the first node to several second nodes,
- obtaining, for a plurality of communication links through which the signal has been sent, at least one physical magnitude representing the distortion caused by each communication link to the signal,
- aggregating said physical magnitudes of said plurality of communication links,
- obtaining a second set of antenna parameters for configuring the beam forming antenna in accordance with said aggregated physical magnitudes.

In order to configure the first node beam forming antenna the same signal is emitted from the latter through several communication links towards several nodes in the network.

This method does not require any high bandwidth resources nor any costly resources at the first node for elaborating the signal.

Furthermore, the first node antenna is configured (in accordance with a second set of antenna coefficients) by virtue of the aggregation of a plurality of physical magnitudes obtained for each link of a plurality of links through which the emitted signal has been transmitted.

It has to be noted that the plurality of links that are taken into consideration are not necessarily the links established between the first node and the above-mentioned several second nodes.

For example, the plurality of links may be the links between a plurality of second nodes that have each received the signal emitted by the first node and said at least one destination node.

It has to be noted that the nodes in the communication network may be mobile or fixed depending on the applications.

In some instances, only one or several nodes in the network may move whereas the remaining nodes may be disposed at fixed locations.

The second nodes and the at least one destination node may comprise each a beam forming antenna both for receiving and emitting a signal from and to one or more other nodes.

According to one feature, aggregating said physical magnitudes of said plurality of communication links is performed by said at least one destination node.

Thus, the aggregation of the physical magnitudes obtained for said plurality of communication links may take place at the same location where said physical magnitudes are obtained in case the latter takes place at the at least one destination node.

Alternatively, the obtaining of the physical magnitudes and their aggregation may take place at different locations.

According to one feature, in case the aggregation of the physical magnitudes takes place at the at least one destination node, the obtaining of a second set of antenna coefficients based on said aggregated physical magnitudes also takes place at said at least one destination node.

However, aggregating the physical magnitudes and obtaining a second set of antenna coefficients based on these aggregated physical magnitudes may be performed at two different and separate locations.

According to another feature, the method comprises obtaining the first set of antenna parameters based on the geometry of the first node and the plurality of second nodes to which the signal is to be sent so that the beam forming antenna is configured to simultaneously emit multiple directional beams towards said plurality of second nodes.

The knowledge of the geometry of the first node and the plurality of second nodes (spatial position of each node) makes it possible to geometrically adapt the first set of antenna parameters of the beam forming antenna. This therefore avoids using an omni-directional emission mode for emitting the first signal at the beginning of the configuration process.

This geometrical adaptation makes it possible to save time in configuring the first node antenna array.

According to another feature, the method comprises obtaining the first set of antenna parameters so that the beam forming antenna configured with said first set of antenna coefficients is prevented from emitting beams in directions other than towards the plurality of second nodes to which the signal is to be sent.

Adapting antenna parameters in this manner (e.g. through windowing) makes it possible to ensure that all the transmissions from the first node will be made in a given direction or in given directions.

This prevents the first node transmissions from interfering with nodes of a possible adjacent communication network.

Obtaining a first set of antenna parameters according to any of the above-mentioned features (on a geometric basis or through a windowing method) may be performed by said at least one destination node.

Alternatively, obtaining this first set of antenna parameters may be performed in any other node in the network depending on the applications.

According to another feature, the method comprises sending said obtained set of antenna parameters to the first node through at least one second node.

This thus makes it possible for the first node to configure its antenna in accordance with either the first set of antenna parameters or the second set of antenna parameters at a later stage.

It is to be noted that the set of antenna parameters (either the first or the second set) may be sent to the first node through one second node selected among the plurality of second nodes.

This selection may be made according to one or several predetermined criteria or the second node may be randomly selected.

For instance, a second node may be selected for transmitting the set of antenna parameters to the first node in case the transmission through a previous second node has been unsuccessful.

For instance, a second node may be selected if a previous transmission with another second node had not succeeded within a predetermined time period.

According to another feature, the method comprises, performed by said at least one destination node, obtaining a set of antenna parameters for a beam forming antenna located at each second node of the plurality of second nodes to which the signal is sent.

It has to be noted that this set of antenna parameters for the second nodes may be obtained based on the geometry of the first node and the plurality of second nodes (with the knowledge of the spatial positions of the nodes).

Also, this set of antenna parameters may be a further set of coefficients obtained at a later stage in the course of performance of the method.

According to the method, each obtained set of antenna parameters is sent to each second node of the plurality of second nodes for configuring their antennas.

According to another feature, the method further comprises obtaining for each link of said plurality of communication links information representing the energy received through said link, the at least one physical magnitude and said information being two types of information characterizing each link of said plurality of communication links.

This information contributing to the setting of the first node beam forming antenna is particularly easy to collect.

For instance, the two types of information are obtained at each node that receives a signal through each link of the plurality of communication links.

According to another feature, each communication link of the above plurality of communication links is a wireless link.

For instance, the wireless links are of the radio type.

However, any other type of wireless link may be used.

It has to be noted that the physical magnitude representing the distortion caused by each communication link to the signal transmitted therethrough may be the impulse response of said communication link and, in particular, of the communication channel in case of radio transmission.

According to a more specific embodiment, each communication link of the plurality of communication links is established between the first node and a plurality of second nodes.

Each of the plurality of communication links is a wireless link.

According to this embodiment, the plurality of second nodes that are linked to the first node through wireless links are linked to said at least one destination node through wired links.

Thus, according to this embodiment, each link between the first node and the plurality of second nodes is a wireless link, whereas each link between said plurality of second nodes and said at least one destination node is a wired link.

According to a further possible feature, this method comprises sending said at least one physical magnitude obtained for each communication link of the plurality of communication links from each node of the plurality of second nodes to said at least one destination node.

Thus, physical magnitudes representing the distortion caused by each wireless communication link to the signal transmitted between the first node and a second node of the plurality of second nodes are obtained in said plurality of second nodes and subsequently transmitted to said at least one destination node through wired links. It has to be noted that each of these second nodes may also obtain information representing the energy received through the corresponding link and then transmit it to said at least one destination node.

Still according to this embodiment, the aggregation of the obtained physical magnitudes of the plurality of communication links and the obtaining of a second set of antenna parameters based on said aggregated physical magnitudes are performed at said at least one destination node.

A second set of antenna parameters may be subsequently transmitted to the first node for enabling the latter to configure its beam forming antenna.

This transmission may be performed through at least one second node among the plurality of second nodes that are wireless connected to the first node.

The second node through which the transmission takes place may be selected as has already been described above.

According to this embodiment, the method may further comprise obtaining a first set of antenna parameters based on the geometry of the first node and the plurality of second nodes, i.e. knowing the spatial positions of the first and second nodes as has already been described above.

According to a further possible feature, the method comprises obtaining a first set of antenna parameters so that the first node antenna configured with said first set of antenna parameters is prevented from emitting beams in directions other than towards the plurality of second nodes to which the signal is to be sent (windowing).

The obtaining of the first set of antenna parameters may take place at said at least one destination node.

The corresponding first set of antenna coefficients thus obtained may be sent to the first node through at least one second node.

This transmission may be performed through a selected second node as has already been mentioned above.

Still according to this embodiment, the method may comprise, performed by said at least one destination node, obtaining a set of antenna parameters for a beam forming antenna located at each second node of the plurality of second nodes to which the signal is sent.

This set of antenna parameters for each second node is then sent to the latter through the corresponding wire link.

This set of antenna parameters for a beam forming antenna located at each second node may also be based on geometrical considerations such as the position of the first and second nodes.

When using at the first node a first set of antenna parameters taking into account the geometry of the first and second nodes and a windowing method all the transmissions performed by the first node at the very beginning are in a direction or directions adjusted so as not to interfere with one or several neighbouring nodes of another communication network.

It is to be noted that the updated set of antenna parameters (second set) of the first node is based on information which has been previously obtained at each second node of the plurality of second nodes.

This information is obtained from the reception of a signal emitted by the first node of which the beam forming antenna has been configured in accordance with the first set of antenna parameters.

The obtained information (for instance the at least one physical magnitude for each communication link and possibly the energy received via this link) may be seen as a feedback on the quality of the received signal (e.g. a predetermined training signal). This feedback information is then forwarded by each second node to the at least one destination node where the first set of antenna parameters is updated based on the received feedbacks.

The updating of the antenna parameters is carried out so that:
- the beams that will be radiated by the beam forming antenna are reduced towards adjacent nodes of another communication network; and
- possible obstacles in the network will be taken into account when emitting beams in a given direction.

According to this embodiment, a possible variant may consist in having relay nodes between the first node and the plurality of second nodes. These relay nodes relay the signal emitted by the first node by means of several paths on the network.

Such relay nodes may act as intermediary nodes between the first and the plurality of second nodes.

According to this variant embodiment, a second set of antenna parameters intended for the first node beam forming antenna is based on actual transmission conditions which take into account real measurements and possible masked paths.

The method according to the above-mentioned embodiment makes it possible to set up at least one good path (reliable path) in the network which is sufficient for the performance of the invention.

If some paths in the network cannot be operational for whatever reason this is not an issue since all the second nodes of the plurality of second nodes receive each the same data signal, which is not the case in the above-mentioned discussed prior art methods.

According to another embodiment, the network is a mesh network and each communication link of the plurality of communication links is established between a plurality of second nodes relaying each the signal sent from the first node according to various paths in the mesh network and said at least one destination node.

In this embodiment each communication link of said plurality of communication links may be a wireless link as well as each communication link from the first node to the plurality of second nodes acting as relay nodes.

For instance, the wireless links may be of the radio type.

According to this embodiment, the configuration operation relies on each signal resent by the relay node or nodes to the at least one destination node and received by the latter.

The configuration or setting of the first node beam forming antenna according to this embodiment proves more precise than in the prior art since more account is taken of the topology of the communication network.

This is because the signal received by the at least one destination node coming from the relay node or nodes is propagated further in the network than the signal received by the relay node or nodes directly from the first node.

It is therefore more representative of what the at least one destination node sees.

Because of this, the radiating field of the first node beam forming antenna thus configured in accordance with an obtained set of antenna parameters is more suited to the network than in the prior art.

More particularly, the at least one destination node takes into account the communication link or links between said at least one destination node and relay node or nodes, unlike the prior art where only the communication link or links between the first node and relay node or nodes are taken into account.

The at least one destination node obtains at least one physical magnitude representing the distortion caused by each communication link between the relay node or nodes and said at least one destination node to the signal transmitted on each said link.

This obtaining may take the form of a measurement of the impulse response of the channel or channels concerned.

According to this embodiment, aggregating the physical magnitudes of said plurality of communication links may be made in the at least one destination node or in another node in the network.

Likewise, obtaining a second set of antenna parameters (for configuring the first node beam forming antenna) in accordance with said aggregated physical magnitudes may be performed by said at least one destination node or in another node in the network such as the first node.

The configuration according to this embodiment is achieved in closed loop from information (feedback) supplied by the at least one destination node and which it has obtained from the first node signal received by means of various paths in the mesh network.

After the performance of each cycle of transmission of a signal by the first node beam forming antenna and reception of one or more returned feedback information, the setting is able to change.

An adjustment of the setting therefore takes place dynamically.

The setting of the first node antenna is thus for example performed at each return of information from the at least one destination node.

It has to be noted that feedback information supplied by the destination node or nodes (return of information) may comprise a set of antenna parameters, such as the above-described second set of antenna parameters.

The system functioning in closed loop makes it possible to attain the optimum configuration (setting) that guarantees the best reception to the destination node or nodes by variations convergent on the best solution.

This is performed without its being necessary to confer predetermined directions on the beams of the first node antenna.

According to this embodiment the first node beam forming antenna may be configured with the first set of antenna parameters enabling emission with a wide angle.

One of the prior art methods discussed above does not make it possible to configure the antenna of the first node in an effective and satisfactory manner with sending by broadcast in this type of network.

Still according to this embodiment, obtaining the two types of information for each link of said plurality of communication links (at least one physical magnitude representing the distortion caused by each communication link to the signal and information representing the energy received through said link) is performed by said at least one destination node.

The latter may easily collect this information by extracting it from the communication link or links between relay nodes and said at least one destination node.

Still according to this embodiment, the method may comprise the transmission, from said at least one destination node to the first node, of the two types of information obtained as mentioned above.

It has to be noted that the volume of information to be transmitted from said at least one destination node to the first node is rather low, which does not require a relatively high rate of transmission as it is the case with the transmission from the first node to the at least one destination node through the relay nodes.

It is therefore possible to use a low rate in order to improve the signal to noise ratio and thus to guarantee good reception by the first node of the useful information for setting its beam forming antenna.

Still according to this embodiment, the method comprises the transmission of a return signal that comprises several separate information fields, the two types of information being receptively in at least two distinct fields.

This makes it possible to put the return data in common in one and the same return signal.

The return signal may take for example the form of a data frame.

According to another possible feature of this embodiment, the signal comprises a field for detecting, on reception of the signal by the first node, of any errors that occurred during transmission.

The presence in such a field of an error correction code makes it possible to ensure that the setting of the first node beam forming antenna is not based on erroneous information.

According to another possible feature of this embodiment, the closed loop configuration of the beam forming antenna is performed according to the two types of information obtained for each link of said plurality of communication links established on various paths in the mesh network.

Still according to this embodiment, obtaining said second set of antenna parameters for the configuration of the beam forming antenna comprises the calculation of a vector of the antenna parameters that involves the division of the sum of the information of the first type relating to the at least one physical magnitude obtained for each link of said plurality of communication links established on the various paths by the sum of the information of the second type representing the energy received through each link of said plurality of communication links.

The calculation of this vector which is to be used for adjusting the first node beam forming antenna may be performed by the first node itself after reception of the necessary returned information.

In this context, the at least one destination node may participate in the configuration.

Thus, the destination node or the various destination nodes transmit not only the state of their communication links (for example, the channels) but also information that makes it possible to standardize this state within a set of states.

Alternatively, the calculation of the vector of antenna parameters may be performed by said at least one destination node and subsequently transmitted to the first node as has already been mentioned above.

Still according to this embodiment, the method may possibly comprise at the first node, the verification of the presence or absence of a returned signal coming from said at least one destination node.

This verification is useful for the setting of the first node antenna since it makes it possible to ensure that the system is functioning in closed loop.

According to still another possible feature depending from the latter, in the case of absence of a returned signal from said at least one destination node, the configuration of the antenna takes into account the information contained in the last returned signal received from this node.

This makes it possible to use the setting loop even in the case where, after having sent a signal through the network, there is no return from the destination node or nodes.

It is to be noted that the beam forming antenna array which has been discussed in the above general description or in connection with any of the two embodiments may be an antenna array.

Referring to the above general description or any of the above-mentioned two embodiments, the mesh communication network may comprise at least one relay node of the DEF ("Decode Encode and Forward") type that decodes the signal received in coded form, re-encodes and transmits it to one or more other nodes in the network.

For example, the communication network may comprise several relay nodes of the DEF type.

According to another possible feature, the mesh communication network may comprise at least one relay node of the AF ("Amplify and Forward") type that amplifies and transmits the signal received, for example in coded form, to one or more other nodes in the network.

For example, the network may comprise several relay nodes of the AF type.

According to another example, the network may comprise one or more relay nodes of the DEF type and one ore more relay nodes of the AF type.

The invention is also directed to a method of configuring a beam forming antenna in a communication network that comprises a first node where the beam forming antenna is located, second nodes and at least one destination node, communication links being established between said first node and said at least one destination node through at least some of said second nodes, characterized in that the method performed at said at least one destination node comprises:
  receiving a plurality of physical magnitudes representing each the distortion caused by a communication link to a signal which has been emitted by the beam forming antenna configured with a first set of parameters and sent through said communication link,
  aggregating said physical magnitudes of a plurality of communication links,
  obtaining a second set of antenna parameters for configuring the beam forming antenna in accordance with said aggregated physical magnitudes.

According to one feature, the method comprises obtaining the first set of antenna parameters based on the geometry of the first node and a plurality of second nodes to which the signal is to be sent so that the beam forming antenna is configured to simultaneously emit multiple directional beams towards said plurality of second nodes.

According to another feature, the method may comprise obtaining the first set of antenna parameters so that the beam forming antenna configured with said first set of antenna parameters is prevented from emitting beams in directions other than towards a plurality of second nodes to which the signal is to be sent.

According to another feature, the method comprises sending said obtained set of antenna parameters to the first node through at least one second node.

The invention is also directed to a method that comprises a first node where the beam forming antenna is located, second nodes and at least one destination node, communication links being established between said first node and said at least one destination node through at least some of said second nodes, characterized in that the method performed at said at least one destination node comprises:
  obtaining, for a plurality of communication links through which a signal which has been emitted by the beam forming antenna configured with a first set of parameters has been sent, at least one physical magnitude representing the distortion caused by each communication to the signal;
  aggregating said physical magnitudes of said plurality of communication links with a view to obtaining a second set of antenna parameters for configuring the beam forming antenna in accordance with said aggregated physical magnitudes.

According to one feature, the method further comprises obtaining said second set of antenna parameters.

According to another feature, the method may comprise sending said obtained set of antenna parameters to the first node through at least one second node.

The invention is also concerned with a method of configuring a beam forming antenna in a communication network that comprises a first node where the beam forming antenna is located, second nodes and at least one destination node, communication links being established between said first node and said at least one destination node through at least some of said second nodes, characterized in that the method performed at said first node comprises:
  emitting a signal by the beam forming antenna configured with a first set of antenna parameters, the same signal being sent from the first node to several second nodes,
  obtaining a second set of antenna parameters in accordance with a plurality of physical magnitudes that have been previously aggregated, each physical magnitude representing the distortion caused by a communication link to the signal which has been sent through said communication link,
  configuring the beam forming antenna with said obtained second set of antenna parameters.

According to one feature, prior to emitting the signal the method comprises receiving the first set of antenna parameters for configuring the beam forming antenna.

According to another feature, depending on the latter, no signal is sent by the beam forming antenna until the first set of antenna parameters is received.

Thus, the configuration method starts with the reception of the first set of parameters.

According to another feature receiving the first set of antenna parameters is performed with the beam forming antenna configured in an omnidirectional reception mode.

According to another feature, the first set of antenna parameters is based on the geometry of the first node and a plurality of second nodes to which the signal is to be sent so that the beam forming antenna is configured to simultaneously emit multiple directional beams towards said plurality of second nodes.

Still according to another feature, the method may comprise obtaining the first set of antenna parameters so that the beam forming antenna configured with said first set of antenna parameters is prevented from emitting beams in directions other than towards a plurality of second nodes to which the signal is to be sent.

According to another feature, the method may comprise receiving a set of antenna parameters for configuring the beam forming antenna through at least one second node.

Another object of the invention is a system for configuring a beam forming antenna in a communication network that comprises a first node where the beam forming antenna is located, second nodes and at least one destination node, communication links being established between said first node and said at least one destination node through at least some of said second nodes, characterized in that the system comprises:
- means for emitting a signal by the beam forming antenna configured with a first set of antenna parameters, the same signal being sent from the first node to several second nodes,
- means for obtaining, for a plurality of communication links through which the signal has been sent, at least one physical magnitude representing the distortion caused by each communication link to the signal,
- means for aggregating said physical magnitudes of said plurality of communication links,
- means for obtaining a second set of antenna parameters for configuring the beam forming antenna in accordance with said aggregated physical magnitudes.

A further object of the invention is a device for configuring a beam forming antenna in a communication network that comprises a first node where the beam forming antenna is located, second nodes and at least one destination node, communication links being established between said first node and said at least one destination node through at least some of said second nodes, characterized in that the device comprises:
- means for receiving a plurality of physical magnitudes representing each the distortion caused by a communication link to a signal which has been emitted by the beam forming antenna configured with a first set of parameters and sent through said communication link,
- means for aggregating said physical magnitudes of a plurality of communication links,
- means for obtaining a second set of antenna parameters for configuring the beam forming antenna in accordance with said aggregated physical magnitudes.

A further object is a device for configuring a beam forming antenna in a communication network that comprises a first node where the beam forming antenna is located, second nodes and at least one destination node, communication links being established between said first node and said at least one destination node through at least some of said second nodes, characterized in that the device comprises:
- means for obtaining, for a plurality of communication links through which a signal which has been emitted by the beam forming antenna configured with a first set of parameters has been sent, at least one physical magnitude representing the distortion caused by each communication to the signal;
- means for aggregating said physical magnitudes of said plurality of communication links with a view to obtaining a second set of antenna parameters for configuring the beam forming antenna in accordance with said aggregated physical magnitudes.

A further object is a device for configuring a beam forming antenna in a communication network that comprises a first node where the beam forming antenna is located, second nodes and at least one destination node, communication links being established between said first node and said at least one destination node through at least some of said second nodes, characterized in that the device comprises:
- means for emitting a signal by the beam forming antenna configured with a first set of antenna parameters, the same signal being sent from the first node to several second nodes,
- means for obtaining a second set of antenna parameters in accordance with a plurality of physical magnitudes that have been previously aggregated, each physical magnitude representing the distortion caused by a communication link to the signal which has been sent through said communication link,
- means for configuring the beam forming antenna with said obtained second set of antenna parameters.

According to another aspect, the invention proposes a method of configuring in closed loop a beam forming antenna in a mesh communication network that comprises a first node where the antenna is located, at least one destination node and several relay nodes between the first node and said at least one destination node, characterized in that the method comprises:
- the sending of a data signal by the beam forming antenna to said at least one destination node through the mesh network, the same signal being sent from the first node to relay nodes,
- the reception, by said at least one destination node, coming from various paths in the mesh network, of several signals issuing from the same signal transmitted after it has been relayed by relay nodes in the network according to the various paths,
- the closed-loop configuration of the beam forming antenna according to the signals received by said at least one destination node according to the various paths.

The advantages already mentioned above in connection with the second embodiment and its following possible features apply here to this other aspect and will not be repeated.

It has to be noted that the beam forming antenna of this other aspect may be an antenna array.

According to one feature, the method comprises, at said at least one destination node, the obtaining, from each signal received by this node on each of the various paths, of two types of information, information of a first type (NUMi) representing on the one hand the communication channel between this destination node and said at least one relay node that relayed the signal to said destination node, and on the other hand data received via this channel, and information of a second type (DENi) representing the energy received via the channel.

According to one feature, the method comprises the transmission, from said at least one destination node to the first node, of the two types of information obtained.

According to one feature, the method comprises the transmission of a return signal that comprises several separate information fields, the two types of information being respectively in at least two distinct fields.

According to one feature, the return signal comprises a field for detecting, when the signal is received by the first node, any errors arising during transmission.

According to one feature, the closed-loop configuration of the beam forming antenna is performed according to two types of information obtained for at least several of the communication channels established on the various paths.

According to one feature, the configuration of the beam forming antenna comprises the calculation of a vector of the antenna parameters that involves the division of the sum of the information of the first type obtained for at least several of the communication channels established on the various paths by the sum of the information of the second type obtained by each of these same channels.

According to one feature, the method comprises, at the first node, the verification of the presence or absence of a return signal coming from said at least one destination node.

According to one feature, in the case of the absence of a return signal from said at least one destination node, the configuration of the beam forming antenna takes into account the information contained in the last return signal received from this node.

According to one feature, the network comprises several destination nodes that are each able to receive several signals from the same signal sent but which was relayed through several distinct channels.

According to one feature, said at least one destination node is also a relay node that is able to relay the signal or signals received to one or more other nodes of the mesh network.

According to one feature, the mesh communication network comprises at least one relay node of the DEF ("Decode Encode and Forward") type that decodes the signal received in coded form, re-encodes it and transmits to one or more other nodes in the network.

For example, the network comprises several relay nodes of the DEF type.

According to one feature, the mesh communication network comprises at least one relay node of the AF type ("Amplify and Forward") that amplifies and transmits the signal received, for example in coded form, to one or more other nodes in the network.

For example, the network comprises several relay nodes of the AF type.

According to another example, the network comprises one or more relay nodes of the DEF type and one or more relay nodes of the AF type.

Another aspect of the invention is a method of configuring in closed loop a beam forming antenna in a mesh communication network that comprises a first node where the antenna is located, at least one destination node and several relay nodes between the first node and said at least one destination node, characterized in that the method comprises:

the sending of a data signal by the beam forming antenna to said at least one other destination node through the mesh network, the same signal being sent from the first node to relay nodes, the closed-loop configuration of the beam forming antenna according to several signals received by said at least one destination node, coming from various paths in the mesh network, and which issue from the same signal sent after it has been relayed by relay nodes in the network according to the various paths.

This method is used in the first (source) node and has the same advantages as the method briefly disclosed above in connection with the other aspect as regards the common steps.

According to still another aspect, the invention is directed to a system for configuring in closed loop a beam forming antenna in a mesh communication network that comprises a first node where the antenna is located, at least one destination node and several relay nodes between the first node and said at least one destination node, characterized in that the system comprises:

means of sending a data signal by the beam forming antenna to said at least one destination node through the mesh network, the same signal being sent from the first node to relay nodes, means of receiving, by said at least one destination node, coming from various paths in the mesh network, several signals issuing from the same signal sent after it has been relayed by relay nodes in the network according to the various paths, means of configuring the beam forming antenna in closed loop according to the signals received by said at least one destination node according to the various paths.

Such a system has the same advantages as the corresponding method briefly disclosed above.

According to other features of the system:

it comprises, at said at least one destination node, means of obtaining, from each signal received by this node on each of the various paths, two types of information, information of a first type $NUM_i$ representing on the one hand the communication channel between this destination node and said at least one relay node that relayed the signal to said destination node and on the other hand data received via this channel, and information of a second type $DEN_i$ representing the energy received via the channel;

it comprises means of transmission, from said at least one destination node to the first node, of the two types of information obtained;

the means of configuring the beam forming antenna comprise means of calculating a vector of the antenna parameters that involve the division of the sum of the information of the first type obtained for at least several of the communication channels established on the various paths by the sum of the information of the second type obtained for each of these same channels;

it comprises, at the first node, means of verifying the presence or absence of a return signal coming from said at least one destination node;

the network comprises several destination nodes;

said at least one destination node is also a relay node that is able to relay the signal received to one or more other nodes in the mesh network;

said mesh communication network comprises at least one relay node of the DEF type that decodes the signal received in coded form, re-encodes it and transmits it to one or more other nodes in the network;

said mesh communication network comprises at least one relay node of the AF type that amplifies and transmits the signal received to one or more other nodes in the network.

Moreover, the invention also concerns a device for configuring in closed loop a beam forming antenna in a mesh communication network that comprises a first node where the antenna is located, at least one destination node and several relay nodes between the first node and said at least one destination node, characterized in that the device comprises:

means of sending a data signal by means of the beam forming antenna to said at least one destination node through the mesh network, the same signal being sent from the first node to relay nodes, means of configuring in closed loop the beam forming antenna according to several signals received by at least one destination node, coming from various paths in the mesh network and that issue from the same signal sent after it has been relayed by relay nodes of the network according to the various paths.

It has to be noted that the beam forming antenna of the above-mentioned other aspects may be an antenna array.

BRIEF DESCRIPTION OF THE SEVERAL VIEWS OF THE DRAWING

Other features and advantages will emerge during the following description, given solely by way of non-limitative examples and made with reference to the accompanying drawings, in which.

DETAILED DESCRIPTION OF THE INVENTION

In general terms, according to a first embodiment, the invention applies to a communication network of the mesh type in which a signal sent from a first (source) node encounters relay nodes that, in their turn, will resend the signal so that it reaches one or more destination nodes following several different paths.

The destination nodes can also serve as relay nodes for relaying the signal and resending it to other nodes.

The network configurations or architectures possible for implementing the invention are manifold and only a few will be described in the remainder of the disclosure.

Figure 1:
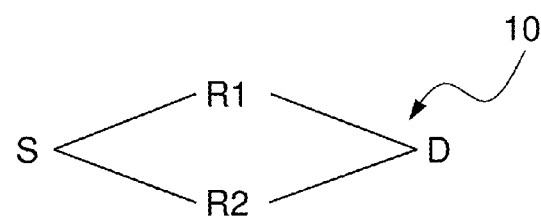
FIG. 1 is a simplified schematic view of a minimum architecture of a mesh network to which the invention applies according to a first embodiment.

FIG. 1 illustrates a minimum architecture of a mesh network 10 in which the invention can be implemented.

The network shown in this Figure comprises a source node S comprising a beam forming antenna, e.g. an antenna array provided with several elementary antennas or antenna elements.

This network 10 also comprises two relay nodes R1 and R2 that are able to receive a signal sent from the source S and to resend each one in the direction of the destination node D.

This network thus shows two redundant paths that make it possible to route a signal to its destination.

Obviously other paths in this network can be envisaged.

Thus the node R1 can itself resend the signal received from the source in the direction of the relay node R2, which will in its turn resend it to the destination node D. Likewise, the node R2 can send the signal received from the source node to the relay node R1, which itself will resend it to the node D.

Figure 2:
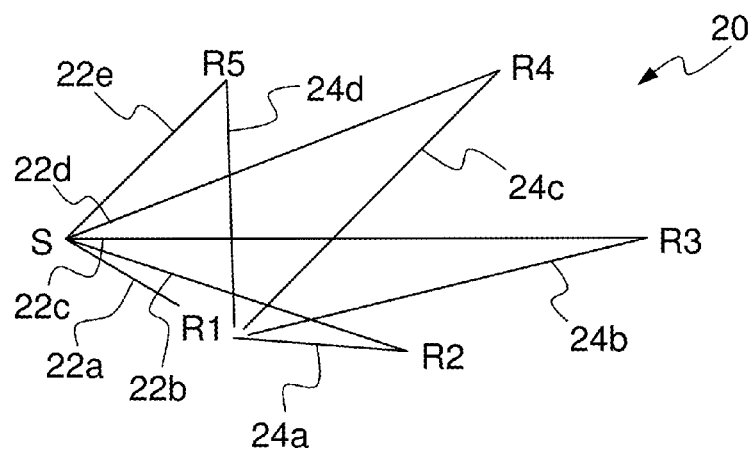
FIG. 2 is a simplified schematic view of another architecture of a mesh network to which the invention applies according to a first embodiment.

The network 20 shown schematically in FIG. 2 comprises a source node S and a plurality of nodes R1, R2, R3, R4 and R5, one or more of which is able to constitute a destination node D. As shown in FIG. 2, the source S, which comprises an antenna array, sends a signal in the direction of the relay node R1 by means of a communication channel 22a and this same signal is sent simultaneously to the relay nodes R2, R3, R4 and R5 by means of respective communication channels 22b, 22c, 22d and 22e.

The relay node R1 in its turn resends the signal to relay nodes R2, R3, R4 and R5 with or without modification through the respective communication channels 24a, 24b, 24c and 24d.

The relay node R3 then proceeds likewise with the other relay nodes and so on.

However, this has not been illustrated in FIG. 2 in order not to overload the drawing.

Figure 3:
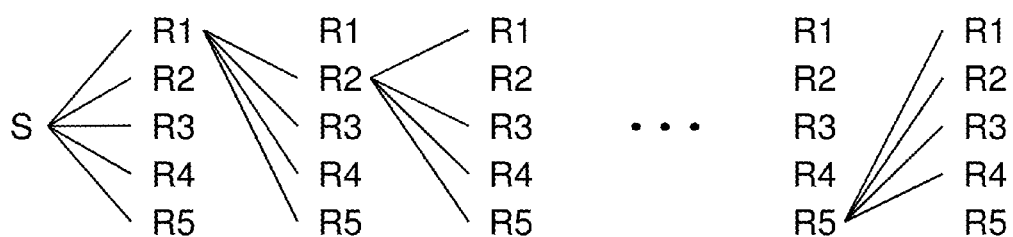
FIG. 3 is another possible representation of the various paths established within the mesh network of FIG. 2.

On the other hand, FIG. 3 shows the sending and resending of the various signals over time from several of the relay nodes in the network, thus showing that each relay node in its turn resends the signal that it has received in the direction of other relay nodes in the network.

As already mentioned briefly above, the relay nodes in the network, whether in the architecture of FIG. 1 or in the architecture of FIGS. 2 and 3, may be relay nodes only of the AF type. Such relay nodes receive, possibly store, amplify and resend the signal.

The signal resent by this type of relay node is thus representative of all the channels through which it passes if all the relay nodes encountered by this signal are of the same type.

Alternatively the network may comprise only relay nodes of the DEF type that receive, demodulate, decode, re-encode, modulate once again and resend the signal to one or more nodes in the network.

The signal resent by such a relay node is then no longer representative of the channels previously taken by this signal.

The network can also comprise relay nodes of two types.

It should be noted that it is preferable for the topology of the network to be known and in particular for the number of nodes connected to this network to be known.

In this regard, there exist numerous possibilities in the prior art for having knowledge of the topology of a mesh communication network.

It should be noted that the invention will more particularly be described according to a communication mode of the synchronous TDMA type (Time Division Multiple Access).

However, the invention is not limited to this transmission mode and other modes such as for example the FDMA (Frequency Division Multiple Access) mode, the CDMA (Code Division Multiple Access) mode, or even another mode, can be envisaged.

In general terms, the source node of the network sends, by virtue of its antenna array, a useful data signal to several nodes in the network (downlink channel) which each receive this signal and resend it to one of more nodes in the network.

The destination node, or each of them if there are several of them, receives a signal coming from a relay or several signals coming from several relay nodes on different paths in the network. It obtains, from each signal received, information on the communication channel established between the destination node and the relay node or nodes that relayed the signal to the destination node.

The destination node, or each destination node if there are several of them, sends on a return channel (the uplink channel) a signal to the source and which supplies to the latter information on the measurements of the channels between relay node and destination node.

The source node receives this information or return data that are useful for the setting or configuration of the antenna array.

More particularly, this data or information received from the destination node or nodes is used for determining the parameters or coefficients of the multiple-beam antenna array.

It should also be noted that this determination can be made in a node of the network other than the source node, or even distributed over several nodes in the network.

Where this step is performed outside the source node, it is necessary to transmit the result of this step to the latter.

The antenna coefficients thus determined will make it possible to set or configure the antenna array in closed loop and the antenna array thus set or configured will once again send a signal more adjusted to the topology of the network than in the prior art.

It should be noted that the coefficients of each antenna element in the antenna array can be set differently and independently of one another.

The antenna array is thus continuously adapted, that is to say dynamically, to the topology of the mesh network. The antenna radiation produced by this network can thus change at each return loop in order to adapt to events occurring on the network such as for example those relating to a masking problem occurring on a direct beam transmitted by the antenna array.

This is because, since the radiation diagram of the antenna array is adjusted under the effect of the calculation and more particularly around an omni-directional radiation diagram, the energy of the radiation of the antenna array is always distributed sufficiently in all directions, even if one of the relay nodes is masked.

This is permitted since the information used for setting the antenna is obtained from the channel or channels established between a relay node and a destination node.

It should be noted that, in the prior art, when a masking problem occurs on a network and a channel established between the source node and the destination node is obstructed, the destination node sends to the source node information representing an obstructed channel.

Thus the source node increases the sending power of the signal to the obstructed channel in order to compensate for this obstruction.

However, the power available at the transmitter will be limited, and this increase in power can take place only to the detriment of the power sent to the other nodes.

There is then, in the prior art, a degradation of the functioning of the network.

Figure 4:
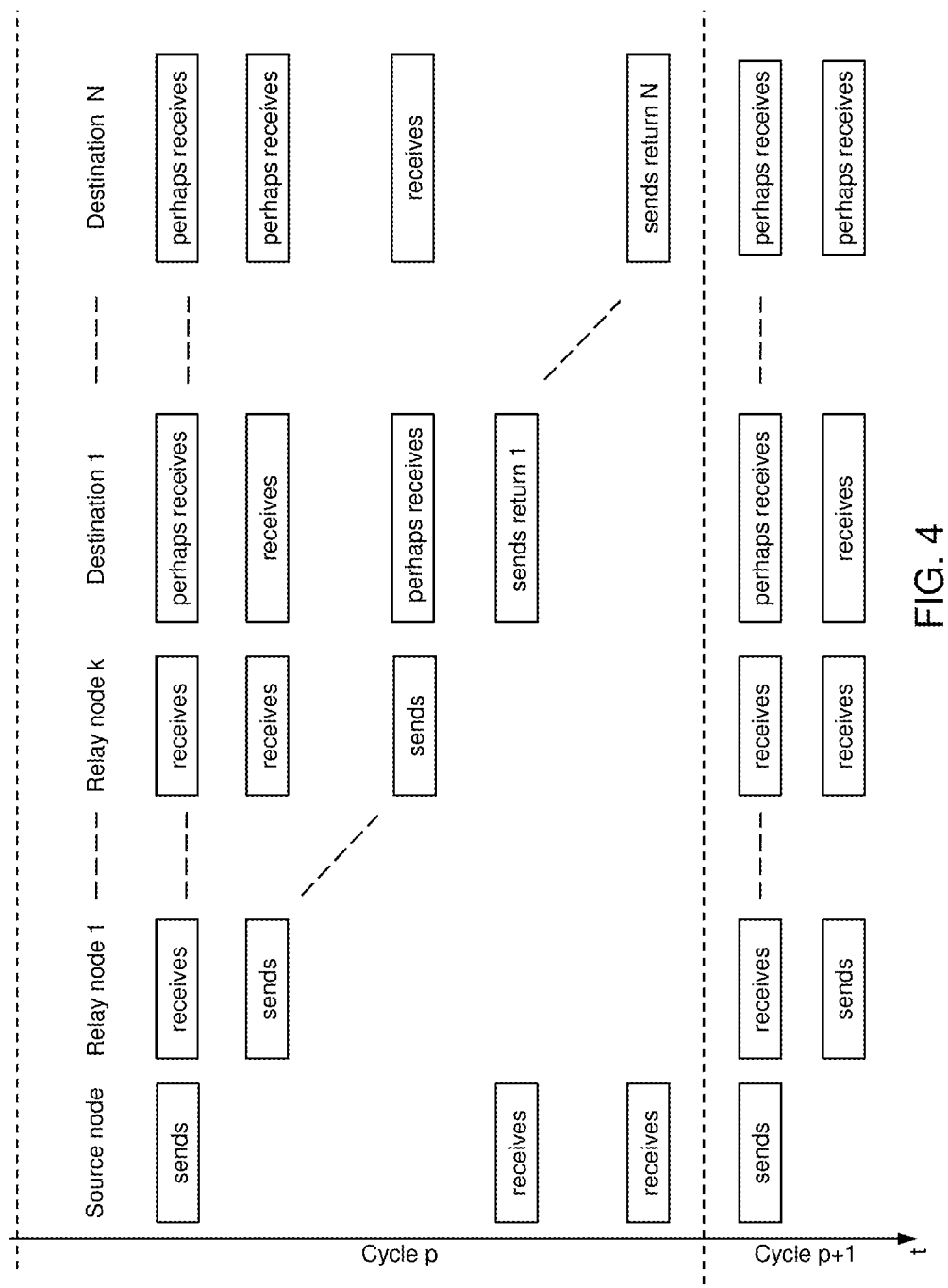
FIG. 4 is schematic view detailing a cycle of sending and receiving signals within a mesh network comprising a first (source) node and a plurality of relay and destination nodes.

FIG. 4 illustrates the synchronous TDMA operating mode in a mesh network and in particular a cycle p of sending and receiving signals by means of the source node.

During the cycle p, the source node sends a useful data signal at high rate in the direction of various nodes in the network (downlink channel), nodes that may be relay nodes or even destination nodes.

This signal is received for example by several relay nodes 1, . . . , k, possibly by destination nodes 1, . . . N.

Relay nodes resend the signal received to destination nodes such as for example the relay node k in FIG. 2.

Thus the destination nodes will receive at least one copy of the useful signal coming from the nearest relay node.

When all the relay nodes have resent a signal, the destination nodes can send a return data signal with a view to setting the antenna array to the source node.

In FIG. 4, the destination node 1 sends a return signal 1 to the source node that the latter receives. Likewise, the destination node N sends a return signal N, which is also received by the source node.

It should be noted that, for the return channel, preferably a return signal transmission regime is used at a lower rate than that of the downlink channel in order to improve the signal to noise ratio. In this way good reception of the return information that is useful for the setting of the antenna array is guaranteed.

When the return signal or signals are transmitted, the relay nodes in the network are not necessary.

According to the applications envisaged and the embodiment chosen, it can be envisaged increasing the number of return signals as well as the setting frequency of the antenna array.

It should be noted that the quality of the control is all the better, the larger the bandwidth of the return channel.

However, in the embodiment described here, the choice has related to a useful data rate in the signal sent to the source that is very high in TDMA transmission mode.

Thus the bandwidth left to the return channel is relatively small in order to obtain this high useful data rate and therefore it is chosen to transmit only a relatively limited quantity of information.

Figure 5:
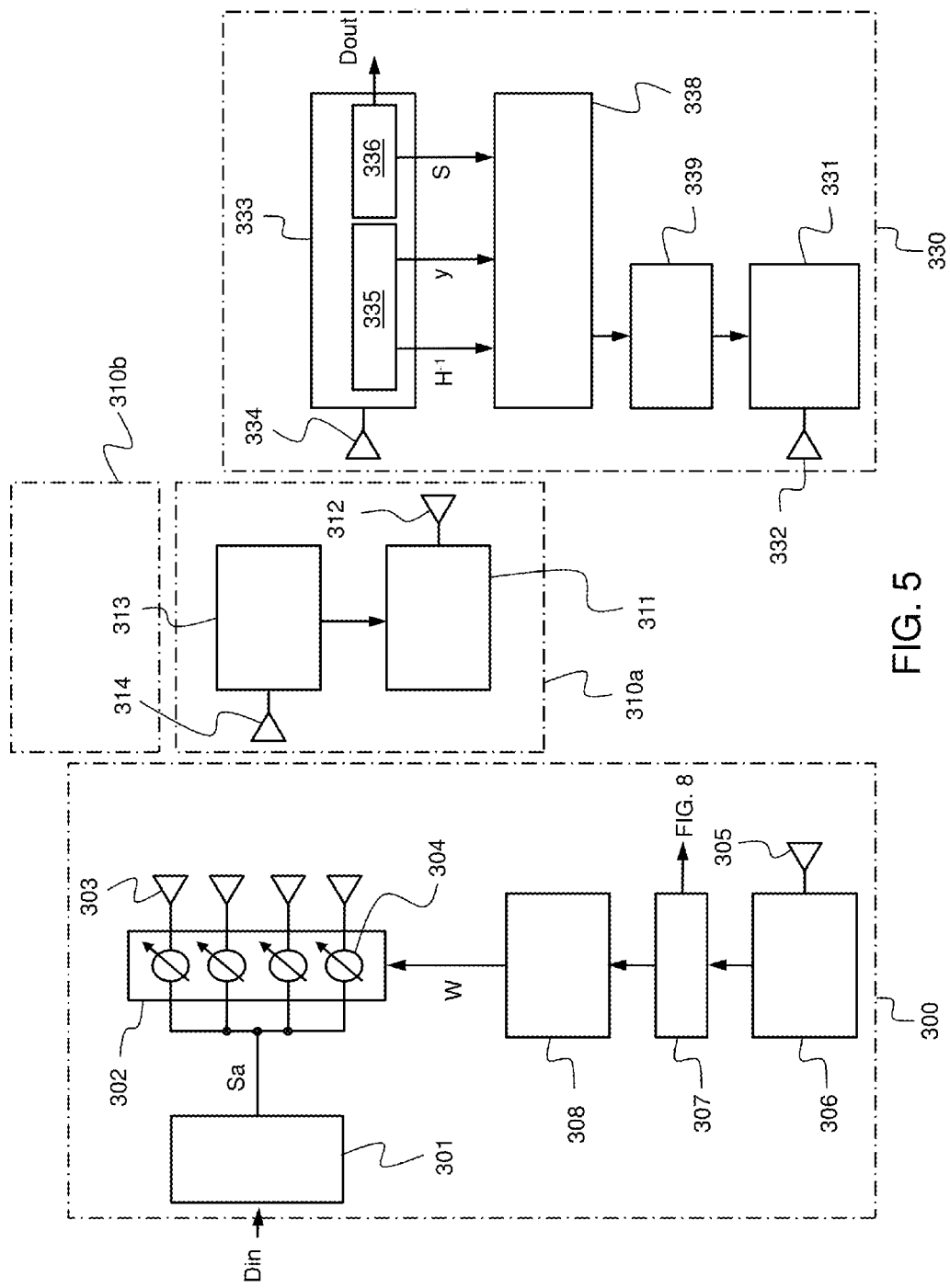
FIG. 5 shows schematically the main elements contained in each of the nodes of the network illustrated in FIG. 1.

FIG. 5 shows the main elements constituting the nodes in the network 10 of FIG. 1.

More particularly, FIG. 5 illustrates a communication network comprising the source node (first node) 300, two relay nodes (second nodes) 310a and 310b and a destination node 330.

The source node 300 receives, in a sending unit or transmitter 301, useful data that it will transmit.

It may be a video or audio digital signal or a file of any format.

The transmitter 301 fulfills the known function of a wireless transmitter, namely it performs the following operations:
framing,
encoding,
digital modulation,
digital to analogue conversion,
frequency transposition.

The transmitter 301 thus supplies a signal "Sa", which corresponds to the frequency transpose of the base band modulation signal "S" after digital to analogue conversion thereof.

The signal "Sa" is sent over an antenna array 302 that comprises several elementary antennas or antenna elements 303.

Each elementary antenna is supplied by a signal adjustable for phase and gain, the adjustment of this signal being represented by the variable element 304.

This adjustment for phase and gain is theoretically performed by a multiplication with a complex coefficient.

In practice, this adjustment is obtained by a series of delay lines or attenuators controlled by switches if the adjustment takes place in transposed band.

The adjustment can alternatively be performed by a multiplication in a signal processing process if it takes place in base band.

The source node 300 also comprises a reception antenna 305 that is coupled to a reception unit or receiver 306 receiving the return signal or signals coming from the destination node 330.

These return data or information will be useful for controlling the antenna array, as will be seen below.

The source node also comprises an extractor module 307 the function of which is to extract, from the return signal or return signals, the information or data useful for controlling the antenna array.

The various operations performed by the extractor module 307 will be explained further during the description given with reference to FIG. 8.

The information or data extracted are then transmitted to the calculation module 308 when the time allotted for the return of information has expired or when the destination node has transmitted its return signal (or when, when several destinations are present in the network, all the nodes have transmitted a return signal).

A calculation module 308 determines antenna coefficients of the antenna array that are adapted using return information or data supplied by the module 307.

These coefficients thus obtained from the return data or information make it possible to adjust the phase and gain of the elementary antennas of the antenna array 302.

More particularly, the return data or information are of two types.

A first type of information, denoted NUMi, represents firstly the communication channel between the destination node i and the relay node that relayed the signal to this destination node, and secondly data of this signal that were received by the destination node via this channel.

A second type of information, called DENi, represents the energy received by the destination node i via this channel. It should be noted that the energy will be standardized after the reception at the source node of all the contributions of the destination node or nodes.

These two types of information make it possible to configure the antenna array 302 dynamically and in a way that is adapted to the topology of the communication network.

It should be noted that the determination of the antenna coefficients can be performed in another node of the network, and then transmitted to the source node, or be reinitiated in a distributed fashion in several nodes of the network and then transmitted to the source node.

FIG. 5 also shows two relay nodes 310a and 310b, where only the interior of the node 310a has been shown for reasons of simplification.

It should be noted that the node 310b is identical to the relay node 310a in this example.

More particularly, the relay node 310 a comprises a transmitter 311 provided with an omni-directional antenna 312, and a receiver 313 provided with an omni-directional antenna 314.

This node may be a node functioning in DEF mode (Decode Encode and Forward), that is to say it can receive, demodulate and store a signal or message, and then resend it after modulation.

It should be noted that, in DEF mode, the signal relayed by the relay does not keep any deformations that it may have suffered while passing through the various channels over the network.

The node can alternatively function in AF mode (Amplify and Forward), that is to say the signal or message received is or is not stored in the node, and then resent without demodulation.

The message signal thus retransmitted keeps any deformations that it may have suffered while passing through the various channels over the network.

FIG. 5 also shows a destination node 330 that comprises a transmitter 331 provided with an omni-directional antenna 332 and a receiver 333 also provided with an omni-directional antenna 334.

The receiver 333 comprises more particularly an equalizer 335 that will make it possible to find the signal that was sent to the destination node 330.

This equalizer is for example of the auto-adaptive type. The general principle of an equalizer is that of an adaptive digital filter intended to compensate for the effects of a transmission channel.

An equalizer of this type is known from the document U.S. Pat. No. 3,368,168.

The receiver 333 also comprises a module 336, the function of which will be indicated below.

As illustrated in FIG. 5, the equalizer 335 supplies the coefficients $H^{-1}$, where H represents the impulse response of the channel that is measured at the destination node 330.

The equalizer 335 also supplies an output y (received signal) corresponding to a symbol in the sent signal.

The coefficients $H^{-1}$ and the symbol y are supplied to a calculation module 338, along with a signal s that is a theoretical modulation symbol.

Each symbol y received is the result of the modification of one of the symbols s by the channel.

It should be noted that, for a learning sequence transmitted as a signal to the destination node and which comprises for example 1000 symbols, the symbol received at position 995 will be chosen and, for the symbol s, the $995^{th}$ symbol in the learning sequence sent (the destination node knows the series of symbols s in the learning sequence).

In this way, for each reception of a symbol y, the symbol y is compared with the symbol s that should have been received.

When the transmission mode used involves only a learning sequence but is considered to be a blind mode, then the symbol s is the one that is situated at the shortest Euclidian distance from the symbol y communicated (in this way the modulus of the symbol y received is compared with the modulus of the symbol s that should have been received).

The function of the aforementioned module 336 is to provide information on the theoretical symbol or symbols that should have been received so that they are compared with the symbol or symbols y according to the learning mode or blind mode.

Since the vector $H^{-1}$ is available after the equalizer has converged (the coefficients of this equalizer are precisely the inverse of the impulse response of the channel), it is therefore necessary to collect this vector preferably towards the end of the learning sequence when this mode is used, or after a sufficiently long time in the case of a transmission in blind mode.

It should be noted that the destination mode may also comprise systems guaranteeing the validity of the information.

It may be a case for example of a device the purpose of which is to verify that the impulse response of the equalizer is in an acceptable form.

After these data are obtained, the calculation module 338 performs the operations of inversion of the vector $H^{-1}$, transposition thereof, and then multiplication with the symbols y and s in order to obtain the first type of information NUMi mentioned above.

It should be noted that the destination node 330 proceeds in the same way in order to obtain information representing the communication channel between this node and the other relay node 310b.

The information obtained for each channel (information on each type per path) is then collected, for example added, in the case illustrated in FIG. 5, where a single destination node is present. Thus a single item of information NUM and a single item of information DEN is obtained at the destination node for all the paths.

However, this calculation could alternatively be performed by the source node after transmission of the information.

If several destination nodes are involved, the information obtained from each node for one or more paths are for example transmitted separately to the source node.

The identical procedure is obviously followed whatever the number of relay nodes that retransmit a signal to the destination node on a given path in the network.

If there are several destination nodes, in a similar fashion to what was described above, each destination node transmits to the source node the information that relates to it and the various items of information of each type are aggregated at the source node.

Moreover, the calculation module 338 forms a standardizing coefficient DENi that represents the energy received by the channel in question.

More precisely, this standardizing coefficient is obtained by calculating the norm of the vector H.

Depending on whether the destination node receives two signals or more coming from various relay nodes over several paths in the network, the second type of information DENi of the destination node 330 is obtained by effecting the sum of the norms of each vector H particular to each channel. The aforementioned two types of information obtained by the calculation module 338 are then transmitted to a module 339, the function of which is to insert them in a return signals. This signal takes for example the form of a data frame.

It should be noted that, if several destination nodes are involved in the setting of the antenna array, then the standardizing coefficient is calculated only at the source node after transmission of the various items of information of each of the destination nodes.

The information or data are added by this module to the frame with a view to enabling the source node to detect any errors that might arise during the transmission of the frame.

The return frame is then transmitted over the return channel by the transmitter 331 and the antenna 332.

Figure 6C:
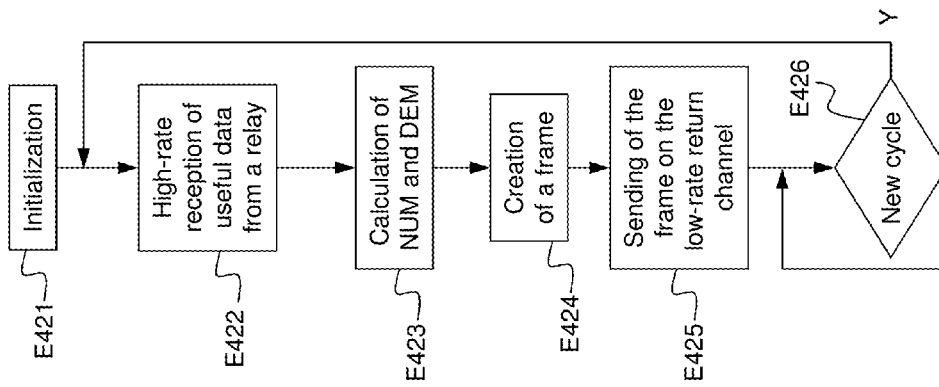
FIGS. 6a, 6b and 6c show schematically algorithms executed within the source node, each relay node and the destination node of FIG. 1.
Figure 6B:
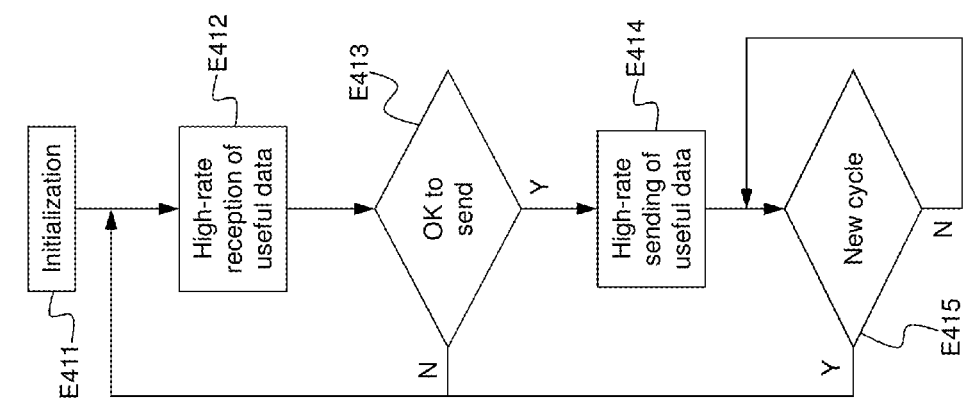
Figure 6A:
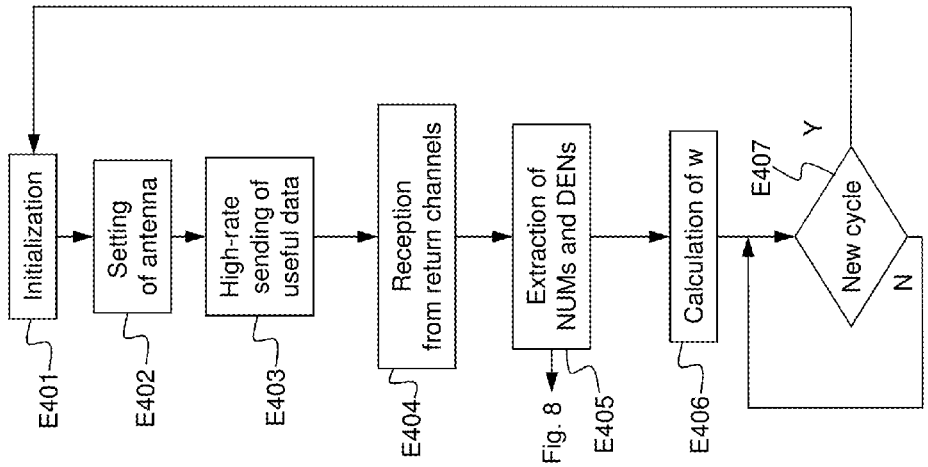

FIGS. 6a, 6b and 6c show algorithms that are used respectively by the source node 300, each of the relay nodes 310a and 310b and the destination node 330.

Each of these algorithms comprises several steps, the execution of which describes the principal functioning of each node.

More particularly, the algorithm in FIG. 6a that is executed by the source node 300 comprises a first step E401 of initializing the various elements present in the source node.

In particular, the antenna vector w, which is the vector of the antenna coefficients of the antenna array 302, is initiated, preferably, with coefficients that are all zero except one of them, which takes the value 1, in order to obtain the antenna transmitting an omni-directional beam.

According to a variant embodiment, the antenna vector w can be calculated provided that the directions in which the various relay nodes are disposed are known.

It is possible for example to use a Godara algorithm as described in the document entitled "Smart Antenna for Wireless Communications", by Frank Gross, page 213, McGraw Hill 2005.

The values of the NUMi information are initialized in an identical fashion, whereas the DENi values are initialized to the value 1.

Step E401 is followed by step E402 of setting or configuring the antenna array.

During this step, the antenna vector w is applied in a multiplicative fashion to the various circuit arms that are connected to the various antenna elements 302.

By taking the antenna vector initialized with all its coefficients at zero except one, the antenna array is thus set initially with an omni-directional beam for the central antenna element, the other antenna elements not producing any radiation.

It should be noted that, in the example chosen, the antenna array can for example comprise seven antenna elements.

The following step E403 is a step of sending of a useful data signal by the antenna array of the source node to one or more destination nodes.

It should be stated that the description of FIG. 3, even if it was done for a network with simplified architecture like the one in FIG. 1, remains valid for a network comprising a large number of nodes and in particular several relay nodes and several destination nodes.

The algorithms in FIGS. 6*a*, 6*b* and 6*c* therefore apply in a corresponding fashion both to the network in FIG. 1 and to those in FIGS. 2 and 3, or even to other networks with more complicated architectures.

A data signal is thus sent in the form of a frame through the mesh network in the direction of the various relay nodes and destination nodes.

The source node then awaits the return signal or signals of the various destination nodes.

At the same time, the algorithm of FIG. 6*b* executed at a relay node begins with an initialization step E411.

During this step, the relay node performs for example a synchronization with the network in which it is situated.

This algorithm next comprises a step E412 of receiving the useful data signal sent by the source node at step E403.

The algorithm comprises a following step E413, the purpose of which is to test whether the signal received is conveying useful information.

It is known for example that, if the relay is functioning in AF mode and the signal received has a marginal signal to noise ratio, then it is not useful to resent it.

Likewise, if the relay is functioning in DEF mode and if, during the operation of demodulation of the signal received, inconsistencies appear such as errors in the signal header, then resending the signal does not prove useful.

On the other hand, if the errors are situated in the body of the signal, the relay node does not necessarily have the ability to correct these errors, nor even to detect them.

Consequently the relay node cannot take a decision not to resend the signal, since only the destination node will have an error detection and correction mechanism.

However, according to one variant, it is possible to envisage that the relay node itself comprises an error detection means, or even a means of correcting these errors.

It may thus be capable of deciding either to resend a signal in so far as it has been possible to correct the errors, or not to resend them in so far as these errors are not correctible.

Moreover, it is also possible to envisage that, in the case of the detection of errors, even if the relay node is not capable of correcting them, it nevertheless decides to retransmit the signal in so far as the destination node will possible be capable of correcting these errors.

In the case of a decision to resend the signal, step E413 is followed by a step E414 of resending the useful data signal.

As mentioned previously, the relay can function in DEF mode or in AF mode, and the signal can thus be retransmitted while losing the information on the previous channel or channels through which it has passed (DEF mode) or simply by amplified, thus keeping the accumulated information on the channels previously used.

It should be noted that the time of resending of the signal must be known precisely if the transmission mode is of the TDMA type as mentioned above.

The algorithm in FIG. 6*b* also comprises a test step E415 the purpose of which is to determine whether or not a new signal reception cycle must be triggered.

The algorithm executed by the destination node 330 in FIG. 5 will now be described with reference to FIG. 6*c*.

This algorithm is the same for other destination nodes that might be present in the network.

The algorithm in FIG. 6*c* begins with an initialization step E421 which, like step E411 in FIG. 6*b*, provides for example for the synchronization of the node with the network.

This step is followed by a step E422 of receiving a signal coming from the relay node, for example the relay node 310*a* in FIG. 5.

The relay node 310 a may be of the AF type or of the DEF type.

It should be noted that, even if the destination node directly receives the signal sent by the source node, then it cannot take this direct reception into account but only the indirect receptions via relay nodes in the network on several paths.

It should be noted that, when the destination node receives several signals issued from the same signal sent by the source node but which were relayed by various relay nodes in the network through various paths, the destination node may decide to keep only one of these signals according to one or more predetermined criteria.

It may for example decide to keep only the signal received with the best signal to noise ratio.

Alternatively, it may decide to keep only the first of the signals received.

According to another variant, if the node can detect the errors, it will choose the signal that has the fewest errors to correct.

When the selection of a signal is made according to the criterion of signal to noise ratio, the filtering enabling this selection to be made is obtained by using the coefficients of the equalizer 335 of the destination node 330.

More particularly, the standard deviation of the data received with respect to the theoretical data is used.

Alternatively, it is possible to use the signal obtained by measuring the power of the signal received and thus filter the various signals according to this power measurement.

The algorithm in FIG. 6*c* comprises a following step E423 made by the calculation module 338.

As already mentioned above, the calculation module proceeds with the inversion of the vector $H^{-1}$ supplied by the equalizer (this inversion makes it possible to find the response H of the channel), the transposition of this inverted vector and then the multiplication thereof with the symbols y and s in order to obtain the previously mentioned information NUMi.

As described above, the calculation module also determines the information DENi.

The following step E424 is a step of creating a return frame intended for the source node.

During this step, the information obtained at step E423 is inserted in the frame.

Figure 7:
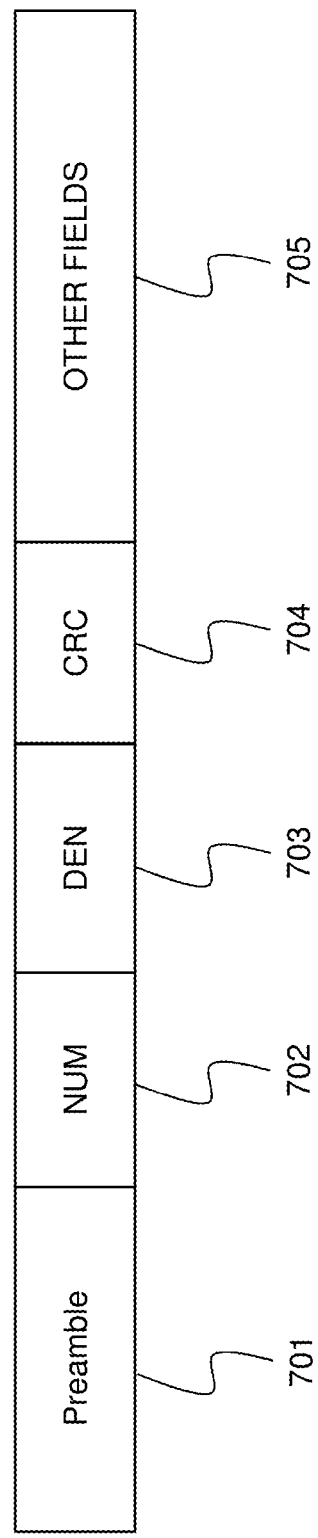
FIG. 7 illustrates schematically the structure of a frame of a return signal.

FIG. 7 illustrates the structure of such a data frame.

This frame comprises a preamble 701 that enables the source node to be synchronized vis-à-vis the destination node for reading of the frame.

Even if all the nodes in the network are assumed to be synchronized with respect to one another, certain differences in clock frequencies may arise from one node to another.

The preamble of the frame makes it possible to measure such differences.

It also makes it possible to adjust all the auto-adaptive processes such as those of the equalizers, the automatic gain control, etc.

The frame also comprises several separate information fields, including two fields 702 and 703 placed behind the preamble and in which the information of the first type NUM and the second type DEN is encapsulated.

According to a variant, the information of each type and which relates to each path is aggregated not with the destination node but with the source node. The return frame will thus transport one evaluation per path, namely an item of information NUM and an item of information DEN. Under these conditions the frame comprises as many information fields as there are paths ending at the destination node.

The frame also comprises a field 704 that makes it possible to detect, when this frame is received by the source node, any transmission errors.

In particular, a CRC field is used that contains a cyclic redundancy code for checking that the transmission has not corrupted the useful data of the signal.

When one or more errors occur and are therefore detected by virtue of this field or when no return is received by the source node, the latter keeps the values of the previous return signals.

One or more other fields 705 can also be used to transport other information in the frame.

The format for transporting this information may for example be a mantissa format disclosed in 32 bits, or a format on an integer number of binary elements in order to transport a quantized result.

The choice of this format generally takes account of the method of performing the setting of the antenna array.

In particular, account is taken of the fact that the setting takes place using a base band signal or transposed band signal.

This is because the setting using a transposed band signal involves a relatively limited number of elements since implementing delay circuits occupies a relatively high place on the silicon.

The frame thus created at step E424 is sent at step E425 over the return channel which, as mentioned above, is at low rate so that the useful signal sent by the source is for its part at high rate.

This step is followed by a step E426 during which is its determined whether or not a new signal reception cycle is triggered.

The frame thus sent by the destination node or the frames thus sent by the destination nodes are received by the source node at step E404 of the algorithm in FIG. 6a.

This return signal or these return signals are then processed at step E405. During this step, all the returns are in particular checked.

This step is performed by the extractor module 307 of the source node 300.

Figure 8:
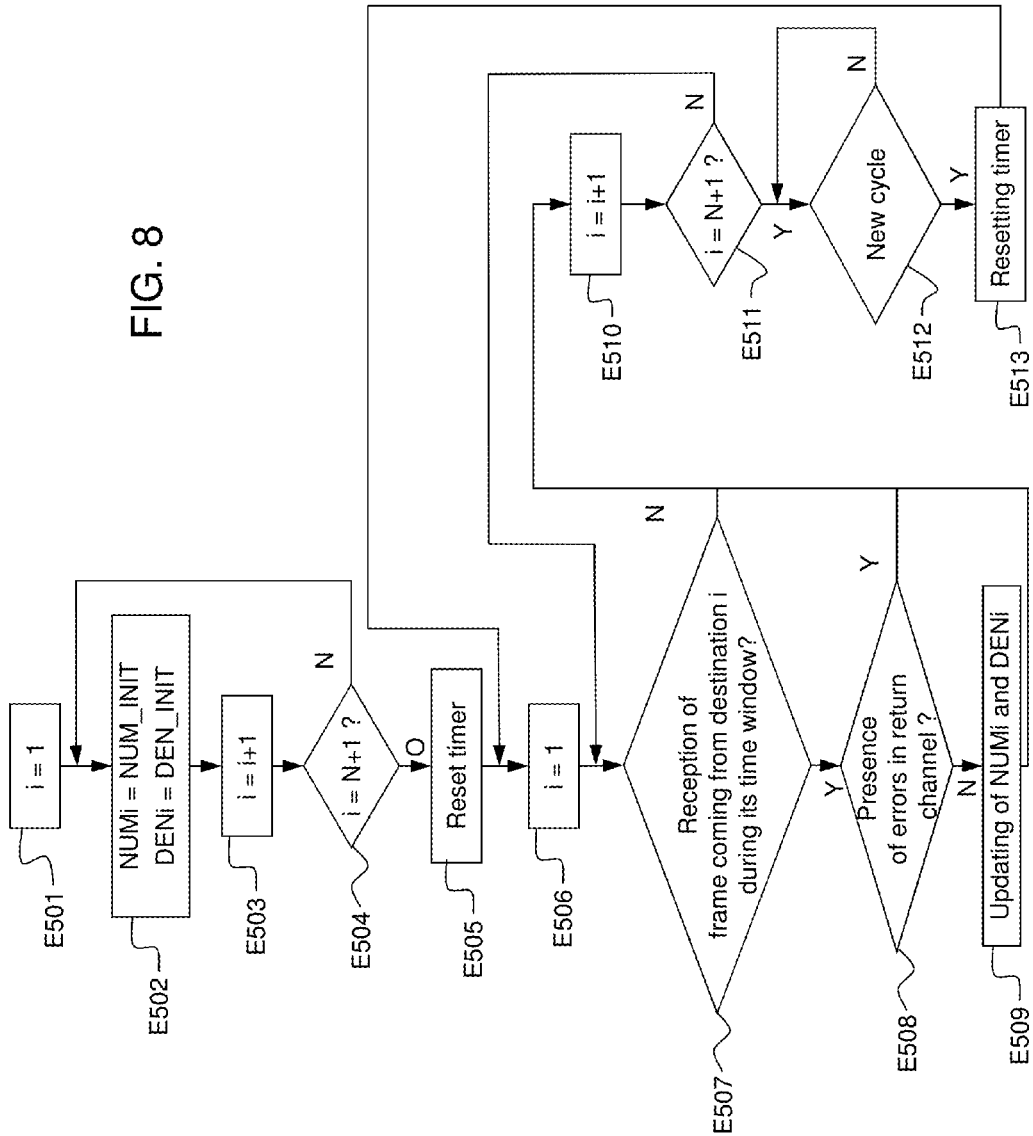
FIG. 8 shows an algorithm detailing the functioning of the extractor module 307 of FIG. 5.

Step E405 is more particularly detailed by the algorithm in FIG. 8.

When this algorithm is executed, the module 307 stores the various values of the vectors NUMi and of the variable DENi received from the N destination nodes.

When there is only one destination node i as in the network in FIG. 5, there is for example only one vector NUMi and only one variable DENi. Aggregation of the various values NUMi and DENi for each of the channels involving the relay node 310a and the relay node 310b is performed in the destination node 330.

Alternatively, instead of having a single aggregated value NUM on the one hand and DEN on the other hand, the source node can receive several values NUMi and DENi corresponding to several channels.

The extractor module 307 also comprises a clock that is reset to zero at the start of the temporal segment reserved for the various return channels.

The algorithm in FIG. 8 comprises several steps E501, E502, E503 and E504 during which the index i and the N values NUMi and DENi are initialized.

The algorithm next comprises a step E505 of resetting the clock.

This resetting triggers the start of a global time window (cycle) during which the source node is ready to receive the various return frame or frames from the various destination nodes. This cycle is divided into several time windows each defining an interval of time during which the source node is ready to receive data from a destination node i.

The following step E506 is a step of initializing the variable i to the value 1.

The following step E507 is a step during which it is checked whether a frame of the destination node i has been received during the time window particular to the node i.

Should a frame have been received from the destination node i, the following step E508 makes provision for detecting, on reception from each return channel, whether errors are present in the data NUMi and DENi received by using the field 704 of the frame illustrated in FIG. 7.

When the error detecting code present in the frame confirms the absence of errors in the aforementioned data or information, then the following step E509 performs an updating of these values and proceeds with the storage thereof.

At the end of the time window particular to the node i, the extractor module 307 transmits these values to the calculation module 308.

Step E509 is followed by a step E510 of incrementing the variable i in order to consider the following destination node.

It should be noted that this step E510 also follows the steps E507 and E508 previously described respectively when no frame is received from the destination node i and errors are present in the return channel coming from the destination node i.

Step E510 is followed be step E511 during which a test is performed in order to determine whether the variable i is equal to N+1.

This test checks whether the node 300 has tested each of the N destination nodes.

When destination nodes remain to be checked, step E511 is followed by step E507, already described.

In the contrary case, step E511 is followed by a test step E512 in order to determine whether a new cycle must be envisaged.

Step E512 is then followed by a step E513 during which the clock is reset, which ends the global time window of the current cycle and begins a new global time window for the new cycle.

Step E513 is followed by step E506 already described in order to proceed with the checking of the return channels for a new cycle.

The purpose of the algorithm in FIG. 8 is to store the N values NEMi and DENi extracted from the return frames, and these values are then transmitted to the calculation module 308, which executes the step E406 in FIG. 6*a*.

It should be noted that the extractor module 307 enables the calculation module 308 to despite everything perform an antenna coefficient calculation even in the absence of valid return data from one or more destination nodes in question.

In this case, the calculation module then takes into account the aforementioned return data, which thus does not lead to an excessively erroneous calculation.

The purpose of the calculation step E406 is to calculate the vectors w of the antenna coefficients of the antenna network 302 in FIG. 5.

Contrary to what was done in the prior art, this calculation mainly takes into account the plurality of channels between the relay nodes and the destination node or nodes corresponding to various paths followed by the signal sent by the source to arrive at its destination.

The calculation of the vector of the antenna coefficients is thus equal to the sum of the information of the first type NUMi obtained by several communication channels established on various paths in the network for a destination node i divided by the sum of the information DENi of the second type obtained for each of these same channels.

This corresponds to the example shown in FIG. 5.

However, when several destination nodes are present, then the vector of the antenna coefficients is equal to the ratio of the sum of the information NUMi for each of the n destination nodes to the sum of the information DENi for these same destination nodes.

In the following disclosure the following notations will be used:
- s is the symbol or series of symbols sent by the source,
- w is the setting vector of the multibeam antenna at the source,
- Hij is the response of the channel going from node i to node j,
- Yij is the signal received at the node j coming from the node i,
- the retransmission mode of the relays is the AF mode.

It should be stated that the antennas of the relays are for example omnidirectional antennas in order to simplify the calculations.

Moreover, * represents the conjugation, H the hermitian transform and T the transpose.

$$\begin{cases} y_{12} = (h_{12}w_1 + h'_{12}w_2 + h''_{12}w_3) \cdot s = H_{12}^T \cdot w \cdot s \\ y_{24} = (1 \cdot H_{12})^T \cdot w \cdot s \end{cases}$$

$$\begin{cases} y_{13} = (h_{13}w_1 + h'_{13}w_2 + h''_{13}w_3) \cdot s = H_{13}^T \cdot w \cdot s \\ y_{34} = (1 \cdot H_{13})^T \cdot w \cdot s \end{cases}$$

The error on the received signal can be estimated at:

$$\begin{cases} e_1 = y_{24} - H_{12}^T \cdot w \cdot s \\ e_2 = y_{34} - H_{13}^T \cdot w \cdot s \end{cases}$$

The objective is to find the antenna vector minimizing the error on the signal received.

It should be noted that the definition of the error is modified compared with the prior art in order to take account of the repeated signals received from the relay nodes.

Minimization of this error gives rise to:

$$\min_w (\|e_1\|^2 + \|e_2\|^2) \Rightarrow \frac{\partial (\|e_1\|^2 + \|e_2\|^2)}{\partial w} = 0$$

$$\Rightarrow \min = E(\|y_{24} - H_{12}^T \cdot w \cdot s\|^2 + \|y_{34} - H_{13}^T \cdot w \cdot s\|^2)$$

$$\Rightarrow \min = E\begin{pmatrix} y_{24}y_{24}^* + (H_{12}^T \cdot w \cdot s) \cdot (H_{12}^T \cdot w \cdot s)^* - y_{24} \cdot (H_{12}^T \cdot w \cdot s)^* - y_{24}^* \cdot \\ (H_{12}^T \cdot w \cdot s) + y_{34}y_{34}^* + (H_{13}^T \cdot w \cdot s) \cdot (H_{13}^T \cdot w \cdot s)^* - y_{34} \cdot \\ (H_{13}^T \cdot w \cdot s)^* - y_{34}^* \cdot (H_{13}^T \cdot w \cdot s) \end{pmatrix}$$

$$\frac{\partial (\|e_1\|^2 + \|e_2\|^2)}{\partial w^*} = (H_{12}^T \cdot w) \cdot s \cdot s^* \cdot (H_{12}^T)^H -$$
$$y_{24} \cdot s^* \cdot (H_{12}^T)^H + (H_{13}^T \cdot w) \cdot s \cdot s^* \cdot (H_{13}^T)^H - y_{34} \cdot s^* \cdot (H_{13}^T) \ldots$$

$$\frac{\partial (\|e_1\|^2 + \|e_2\|^2)}{\partial w^*} = 0 \Rightarrow ((H_{12}^T)^H H_{12}^T + (H_{13}^T)^H H_{13}^T) \cdot s \cdot s^* w =$$
$$y_{34} \cdot s^* \cdot (H_{13}^T)^H + y_{24} \cdot s^* \cdot (H_{12}^T)$$

$$\frac{\partial (\|e_1\|^2 + \|e_2\|^2)}{\partial w^*} = 0 \Rightarrow w = \frac{y_{34} \cdot s^* \cdot (H_{13}^T)^H + y_{24} \cdot s^* \cdot (H_{12}^T)}{s \cdot s^* \cdot ((H_{13}^T)^H H_{13}^T + (H_{12}^T)^H H_{12}^T)}$$

More generally, the vector of the antenna coefficients is written as follows:

$$w = \frac{\sum_{i=1}^{N} y_i \cdot s^* \cdot (H_i^T)^H}{s \cdot s^* \cdot \sum_{i=1}^{N} (H_i^T)^H H_i^T}$$

NUMi=$y_i.s^*.(H_i^T)^H$ and DENi=$(H_i^T)^H H_i^T$ will be posed.

The number N designates the number of destination nodes, Hi corresponds to the impulse response of the channel measured at the destination node i (it is a case of the channel from relay node to destination node) and it is a case of a vector with a dimension equal to the number of antenna elements of the antenna array.

Yi is a data item received in the digital modulation space and s is the corresponding transmitted data item in the same space.

In the preferred example embodiment, the symbol used to parameterize the calculation is known.

This symbol is for example a symbol in a learning sequence.

According to this calculation method the receiver knows the sequence sent and can thus orient the calculation towards the optimum.

Alternatively, a blind calculation method can be used.

According to this method, the sequence transmitted is not known but certain statistical characteristics (mean, standard deviation, etc) of the transmitted signals are for their part known.

In the embodiment described, the calculation of the vector of the antenna coefficients is distributed.

Thus this calculation is done partly at the destination node or nodes and partly at the source node, which performs only the adding and division of the information previously obtained at the destination nodes.

It should be noted that the vector of the antenna coefficients representing the channel must have the same size as the number of antenna elements of the network.

If the equalizer has more cells that the number of antenna elements in the network, then the vector $H^{-1}$ is constructed by truncating the vector of the coefficients of the equalizer on each side of the coefficient having the maximum energy.

According to a variant, the final calculation of the vector of the antenna coefficients w can be made in one of the destination nodes, for example in the last of the destination nodes in the order of access to the medium.

This node thus receives the various items of information from the other destination nodes and calculates the vector of the antenna coefficients w.

Once the calculation has been done, this node then transmits the result of its calculation to the source node by a return signal.

It should also be noted that the calculation module 308 can alternatively be integrated in one of the relay nodes of the communication network.

In addition, the volume of data to be transmitted to enable the antenna array to be set depends on the point where the calculation module 308 is located.

This is because, if this module is placed in a node other than the source node, then the volume of information to be transmitted on a return channel will be greater than if this module is in the source node.

Because of this, the throughput on the return channel will be higher and will therefore occupy a larger bandwidth.

When the vector w has been calculated at step E406, then a test step E407 is performed in order to determine whether a new cycle must begin.

In the affirmative, the antenna network is then set by means of the previously calculated antenna coefficients.

In this way the phase and amplitude of each antenna element of the antenna network is adapted by virtue of the information obtained on one of the return channels coming from the various destination nodes.

This setting is thus done at each loop according to the various items of information obtained by the destination node or nodes and returned to the source nodes, with or without prior calculation.

Each antenna array is thus set at each cycle of sending a useful data signal and receiving one or more return signals.

This configuration of the antenna array makes it possible to adjust the various antenna elements of the latter according to the architecture of the network, dynamically and in a more precise manner than in the prior art.

The configuration of the radiation diagram produced by the antenna array is thus able to change and thus be modified at each loop according to return information from the destination node or nodes of the mesh network.

This is made possible in particular by the fact that account is taken of the measurements of the channels from relay nodes to destination nodes along several paths of the mesh network.

More particularly, if the last relay node is in DEF mode, it is a case of the measurement of the channel between this node and the destination node.

If on the other hand the last relay node is in AF mode, account is taken of the channel between the previous relay node and the destination node, if the previous relay node is in DEF mode.

In general terms, account is taken of the channel between the last relay node in DEF mode and the destination node, or even between the source node and the destination node if, on the path, all the nodes are in AF mode.

The signals thus arriving at the destination nodes through these different paths thus carry very useful information on the structure of the network and in particular on what is seen by the destination nodes.

Moreover, taking the measurement of the channel issuing from an omni-directional antenna of one of the relay nodes, multibeam antenna coefficients will be obtained by calculation, centered around those of an omni-directional antenna.

This makes it possible to avoid the creation of powerful interference.

It is however possible to adjust by calculation the radiation diagram of the antenna array around an omni-directional diagram.

Thus interference liable to be created will be limited and will not put in danger reception at all the destination nodes.

The following figures illustrate a possible second embodiment of the invention.

Figure 9:
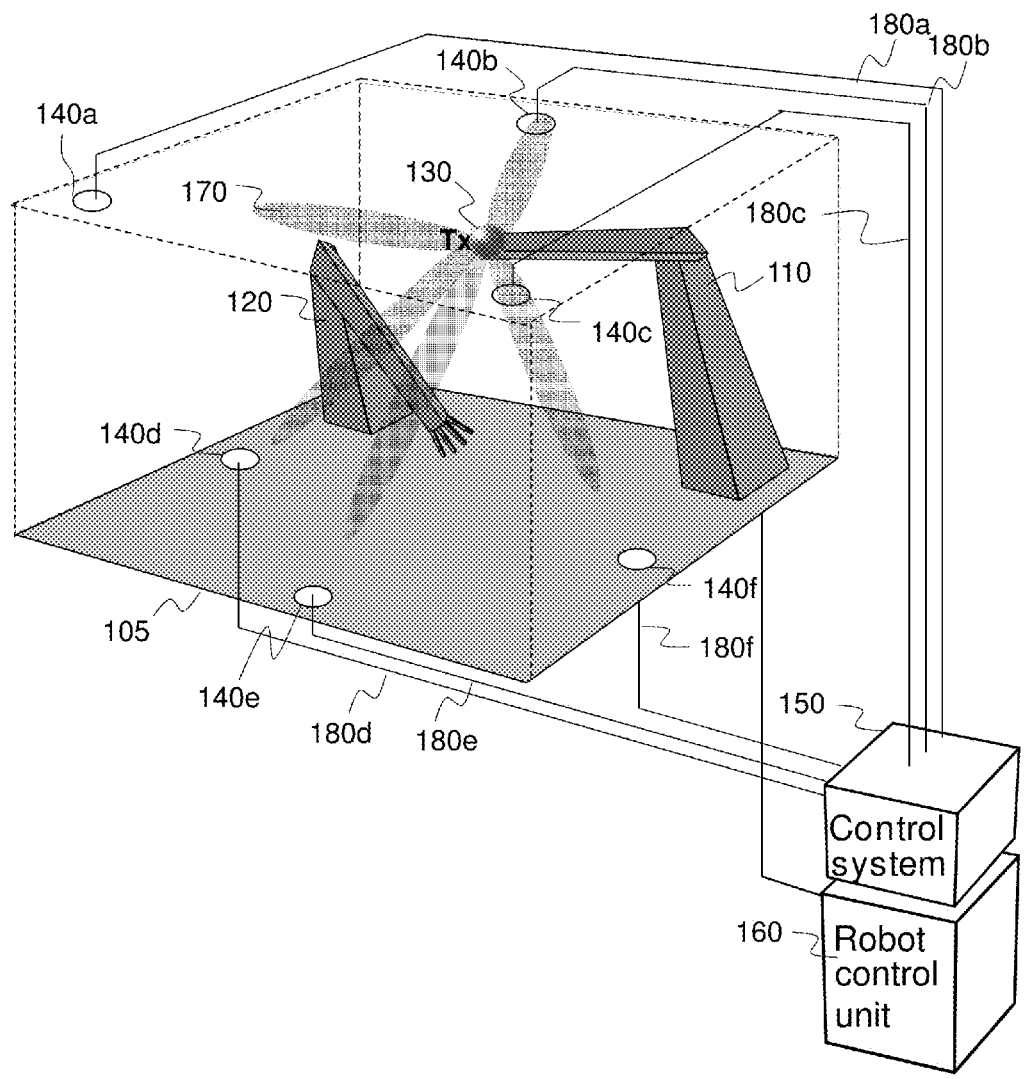
FIG. 9 depicts a second embodiment of a network with a movable first node (image source) that is wireless connected to a plurality of fixed second nodes which, in turn, are connected to a separate system control.

FIG. 9 is an example of a communication system 100 where a movable (first node) image source is connected to a plurality of fixed second nodes through wireless communication links, e.g. of the radio type. Each second node is connected to a separate and remote destination node (system control) through a wired link. Such a system makes it possible to implement methods for configuring beam forming antennas according to the invention. It is to be noted that the beam forming antennas may be antenna arrays but other types of antennas may, alternatively, be envisaged as will be discussed later on.

The system 100 comprises an industrial robot having an arm 110 and one or more arms 120. The arm 110 is equipped at its free end with an image capture device (video camera or still image camera). In order to allow the wireless transmission of the captured images, the arm 110 is also equipped at its free end with a first node 130 connected to the image capture device. This first node may receive its power supply from the robot arm only. The only communication means of first node 130 is wireless. Thanks to the robot arm 110, first node 130 is able to move in order for the image capture device to be at the best location for observing.

In order to communicate with the first node 130, a plurality of second nodes 140a, 140b, 140c, 140d, 140e, 140f are arranged at fixed locations within the robot working space 105. All the second nodes are located within the first node wireless coverage area. In the present embodiment six second nodes are used, but a different number of second nodes may be envisaged. A satisfactory number may be a compromise between economical aspects and the efficiency against shadowing.

Thanks to multiple second nodes the quality of the transmission may be enhanced: the whole error rate is lower when the transmission can be performed with spatial diversity (it means that data is simultaneously transmitted to several destination nodes through different paths) for the same data than through a single path.

All the second nodes are connected to a control system 150 through communication links such as the wired lines or connexions 180a, 180b, 180c, 180d, 180e, 180f respectively.

A modem may be included in each second node and the interconnection between the second nodes and the control system may be performed thanks to digital high speed interfaces using LVDS signals. These high speed wired interfaces are point to point organized, or may be bus oriented. They could be 1000BaseT or compliant with any other standard, or can be proprietary and use any physical medium enabling high data rate transmission: twisted pairs, optical fiber or coaxial cable. Other alternative embodiments may be envisaged where the interconnection physical medium is analog and modems are not included in the second nodes, but in the system control. It has to be noted that this list of interconnection possibilities is not exhaustive.

The control system 150 acts as a central unit and is in close relationship with the robot control unit 160. Robot control unit 160 is directly controlling the robot arms 110 and 120 and therefore is continuously aware of the first node 130 position and orientation. This geometric information is communicated to the control system 150 which may determine (e.g. through computations), antenna parameters of all second nodes 140a, 140b, 140c, 140d, 140e, 140f, and also antenna parameters of first node 130. This first set of antenna parameters is established on the basis of the geometry (spatial positions) of the nodes.

An objective is for example to wirelessly transport high definition images, and for example 60 GHz millimeter waves may be used for this high bandwidth transmission. However, when using this transmission frequency obstacles may cut or intercept the antenna beams 170 (ex: RF beams between an emitter and a receiver. Robot arm 120 is used for handling objects and is not directly involved in wireless communications. Nevertheless, depending on its position it may be located in the Line Of Sight of some transmission paths between first node 130 and one or more second nodes. Thus, robot arm 120 may disturb the wireless communication between first node 130 and second nodes 140a, 140b, 140c, 140d, 140e, 140f.

Figure 10A:
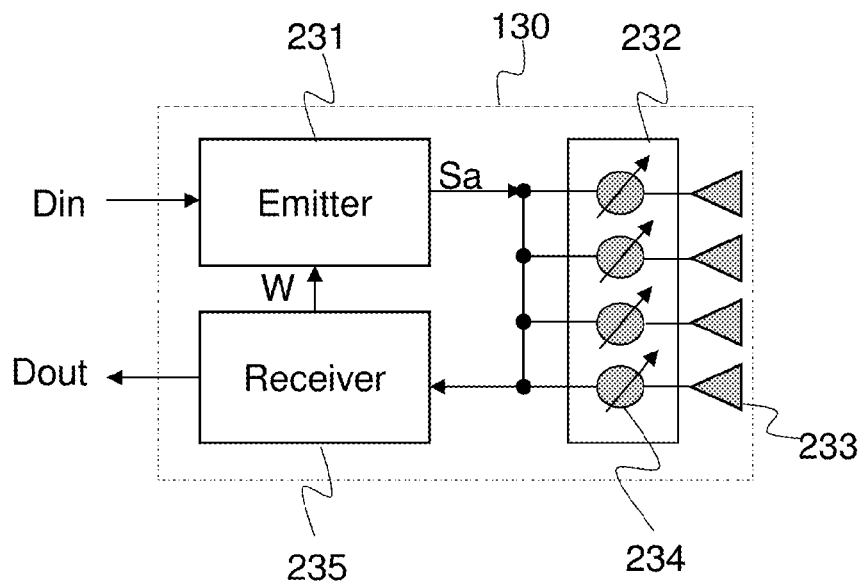
FIG. 10a illustrates the schematic structure of a first node communication device implementing a method for configuring nodes beam forming antennas according to a second embodiment of the invention.

FIG. 10a illustrates the main elements of first node 130 and the architecture thereof.

The node 130 has the capability of functioning with its antenna configured in multiple beams (multi-beams). It also has the capability of configuring its antenna for omni-directional reception purpose.

Node 130 includes an emitter module 231 that receives from the image capture device a digital signal Din to be transmitted. This signal may be video, audio or any type of file. The emitter 231 is a typical wireless emitter, and accordingly performs the following functions:
framing,
encoding,
digital modulation,
digital to analog conversion,
frequency transposition.

The emitter 231 provides a signal "Sa" corresponding to the transposed frequency from the baseband modulation signal "S" after the digital-to-analog conversion. The "Sa" signal is sent to an antenna array 232 which includes several elementary antennas or antenna elements 233. Each antenna element is fed by a signal adjusted in phase and amplitude, the adjustment of the signal being symbolized by the variable element 234. This phase and amplitude adjustment is performed, in theory, by a multiplication with a complex coefficient. In practice, this adjustment is achieved by using a series of delay lines and attenuators controlled by switches if the adjustment takes place in transposed band. The adjustment may alternatively be performed by a signal processing multiplication if it occurs in the baseband. The signal which is to be emitted by each antenna element is emitted through a plurality of communication links between each antenna element and each second node respectively.

First node 130 also includes a receiver module 235 that is connected to the antenna array 232. Thus, first node 130 is able to receive a signal coming from second nodes 140a, 140b, 140c, 140d, 140e, 140f through respective communication links. It has to be noted that the above communication links are for example communication channels. In the operating mode, received data generally includes control information to be forwarded to the image capture device. Received data may also comprise configuration data (antenna parameters or coefficients) for the configuration of first node 130 antenna array. More particularly, the antenna coefficients which are computed by control system 150 (first or second set of antenna coefficients) and communicated to first node 130 through at least one of the second nodes 140 are filtered by receiver module 235. The antenna vector "W" which is the vector of coefficients of the antenna array 232 is communicated to the emitter module 231 for being provided to the antenna array.

Figure 10B:
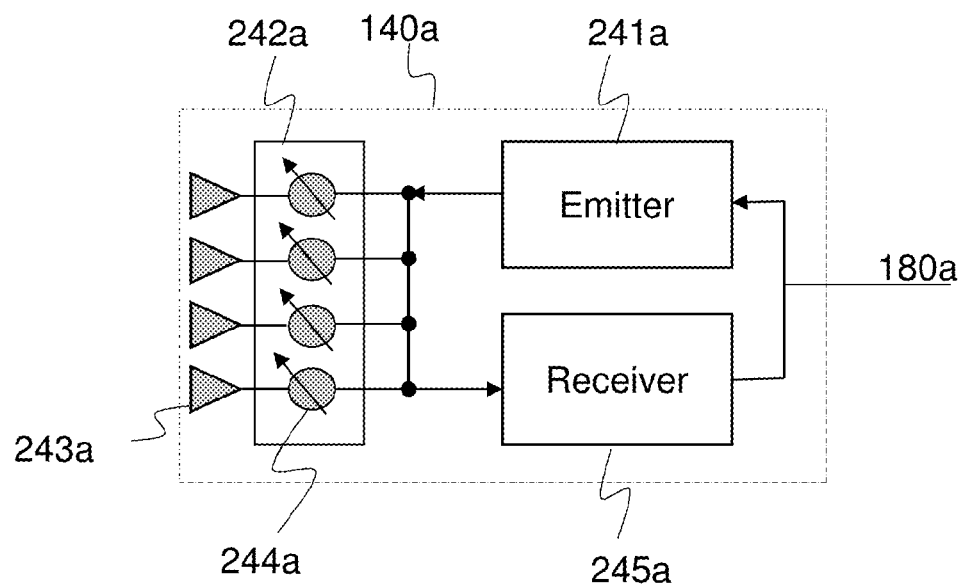
FIG. 10b illustrates the schematic structure of a second node communication device implementing a method for configuring nodes beam forming antennas according to a second embodiment of the invention.

FIG. 10b illustrates the main elements of the second node 140a and the architecture thereof. However, the same architecture may correspond to any of the other second nodes 140b, 140c, 140d, 140e, 140f.

The second node 140a has the capability of working with its antenna configured in directional mode. It includes emitter module 241a that receives, from control system 150 through the wired line 180a, a digital signal to be transmitted to the first node 130 (node 140a, here, acts as a relay node), or a control information for itself. The emitter 241a is a typical wireless emitter, that is similar to emitter module 231 already described above. Node 140a also includes a receiver module 245a that is similar to receiver module 235 already described above. However, it may also forward the data wirelessly received from first node 130 to control system 150 through the wired line 180a.

The second node 140a has also the capability of measuring one or several physical magnitudes representing the distortion caused by the communication link (here the channel) to a signal transmitted therethrough. The channel impulse response "H" is an example of physical magnitude. After convergence of the equalizer of the receiver 245a, the equalizer coefficients are corresponding to the inverse of the channel impulse response. The equalizer may also provide a received signal "y" (after communication channel alteration) corresponding to the reception of a known "s" symbol transmitted by the first node 130. The "$H^{-1n}$" coefficients and the "y" symbol are provided to the control system 150 through wired link 180a.

Figure 11:
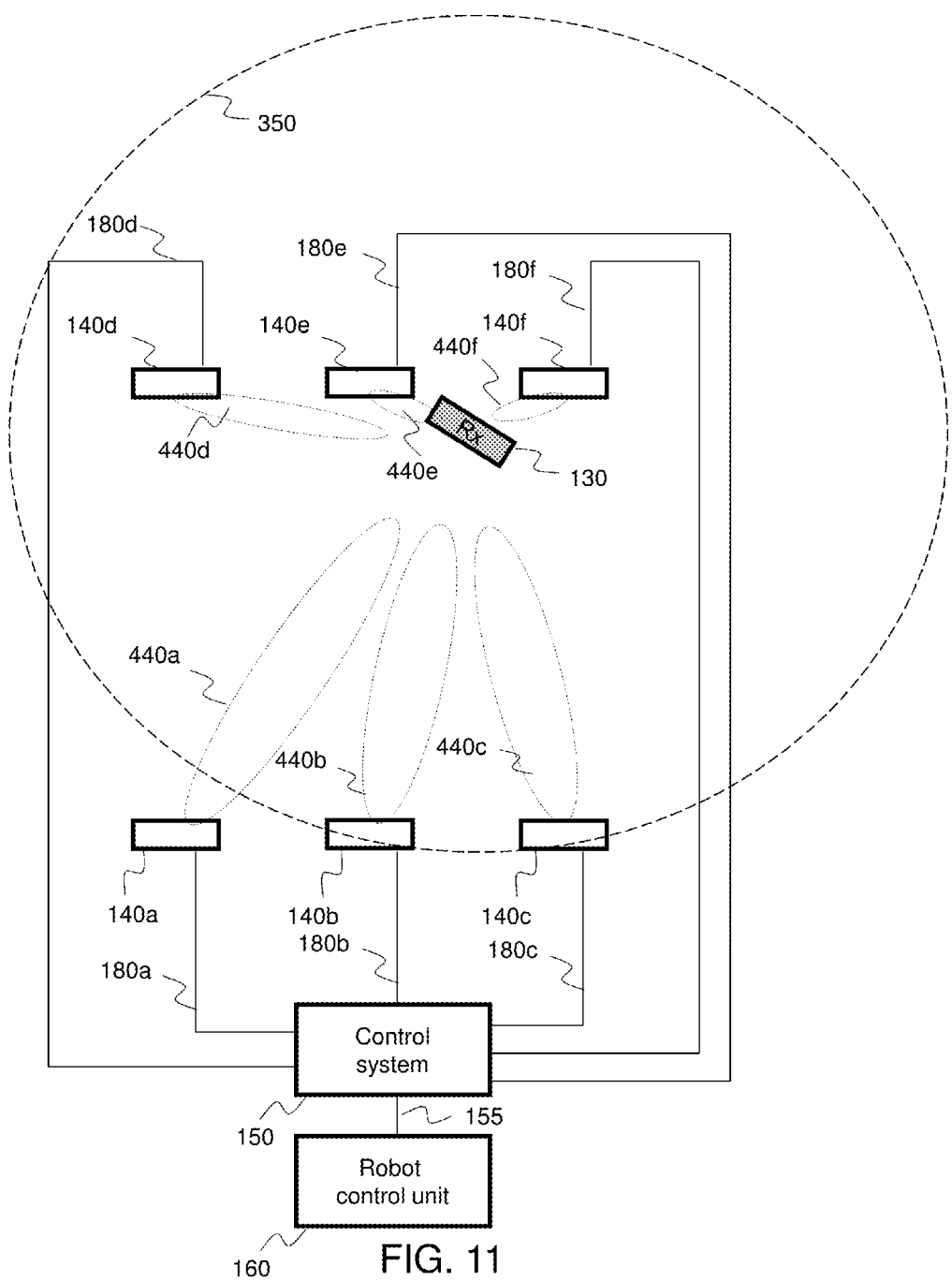
FIG. 11 illustrates the main elements of a communication network implementing a method for configuring nodes beam forming antennas according to the second embodiment of the invention.

FIG. 11 is another representation of the communication network shown in FIG. 1 according to a functional approach.

It has to be noted that robot control unit 160 is connected to control system 150 through a link 155 and the various second nodes 140a-f are respectively connected to control system 150 through links 180a-f. As has already been mentioned, these second nodes are fixed, and first node 130 which is secured to the arm of the robot is susceptible of moving between two data communication sequences.

The directional beams that are emitted from the antenna arrays of second nodes 140a-f, are respectively referenced 440a-f, while the possible omni-directional reception beam of first node 130 is referenced 350 (circle shown in dotted lines in FIG. 11).

The beginning of a new cycle takes place following a command generated by the robot control unit 160 in order to move first node 130 to a new spatial position and with a new spatial orientation. The new geometric coordinates of first node 130 are communicated by robot control unit 160 to control system 150. The latter then computes the antenna coefficients of all the nodes from geometric data based on the new spatial position and orientation of first node 130 and the fixed spatial positions of second nodes 140a-f.

Each antenna of the second nodes is configured for directional communication towards first node 130 by virtue of the geometrically computed antenna coefficients sent by control system 150.

The initial "W" vector of coefficients of the antenna array of the first node (first set of coefficients) is determined by control system 150 so as to allow simultaneous multiple directional communications of the first node towards each second node. In addition, the initial "W" vector of coefficients of the first node antenna array may be modified through a windowing method in order to prevent any transmission from first node 130 towards directions along which the beam might extend outside the robot working area 105. The first set of antenna coefficient is thus adapted to limit, or at most prevent, any interference with area 105 environment such as adjacent working areas.

It has to be noticed that the corresponding theoretical multiple paths may be impacted by a shadowing effect due to the presence of robot arms 110 and 120.

The initial "W" vector of coefficients of first node 130 antenna array (initial set of antenna coefficients) possibly modified with a windowing method is then to be communicated to first node 130 though at least one second node so that the antenna array of the latter may be configured accordingly.

Figure 12A:
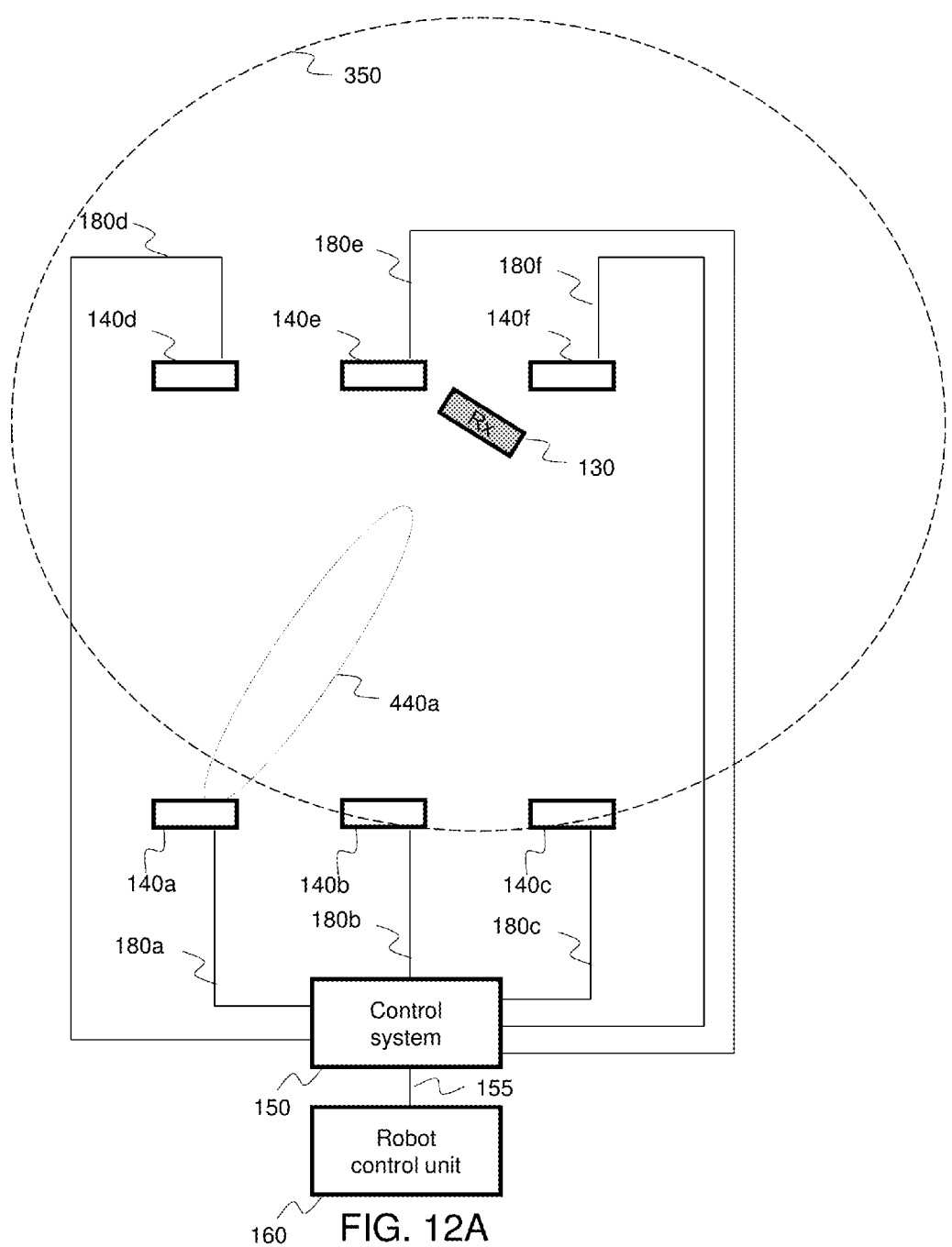
FIG. 12a illustrates the main elements of the communication network of FIG. 11, with the second node 140a transmitting directionally and the first node 130 receiving omni-directionally.

FIG. 12a illustrates the start of the process (training sequence) for the antenna setup configuration. While first node 130 has not yet received the first set of antenna coefficients, it is configured by default in an omni-directional reception mode (reception area 350).

The first set of antenna coefficients of the first node antenna array is transmitted, for example, through link 180a to second node 140a for subsequent wireless transmission to first node 130. This is because second node 140a is selected as the first candidate for transmitting data. This selection could be based on criteria as the shortest distance between first node 130 and one of second nodes 140a-f. Alternatively, any other criteria could be used, or no criteria (random selection of a second node). This transmission of the first set of geometrically determined antenna coefficients is performed with the antenna array of second node 140a. This antenna array has been previously configured for directional transmission towards first node 130 (thanks to a geometrically computed set of antenna coefficients sent by system central 150).

The beam of second node 140a is referenced 440a.

Figure 12B:
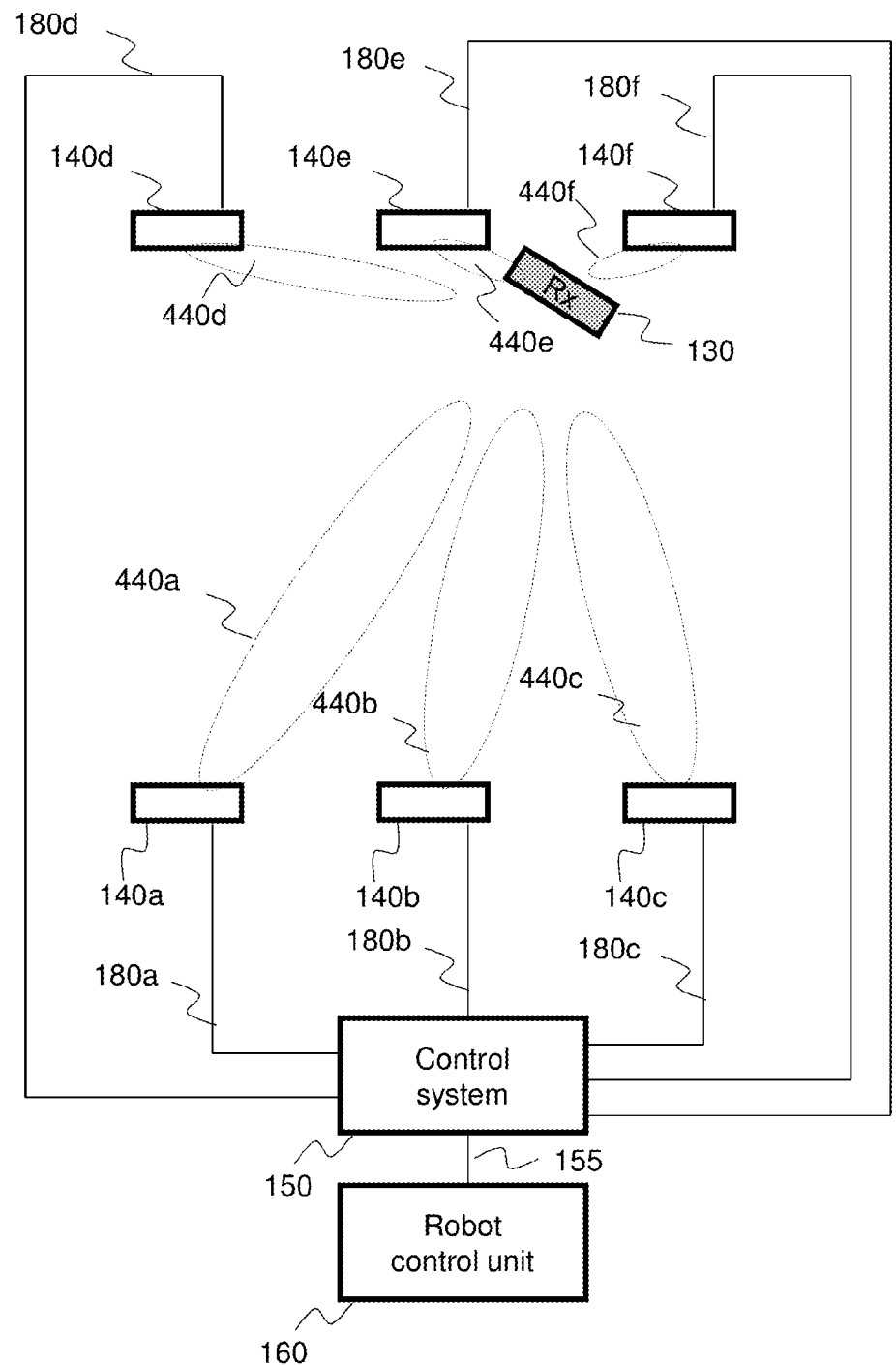
FIG. 12b illustrates the case where all the second nodes 140a, 140b, 140c, 140d, 140e and 140f are configured according to a directional reception mode vis-à-vis first node 130.

FIG. 12b represents the continuation of the configuration process (training sequence). Each of the second nodes 140a-f has its antenna oriented towards the first node 130 (as geometrically computed by control system 150 at the beginning of the new cycle), and is waiting for a response from first node 130.

In FIG. 12b, there is no reply from first node 130 because, for example, a shadowing effect due to a robot arm has prevented first node 130 to receive the signal sent directionally by second node 140a. In such a case, after expiration of a predetermined time period, the process of FIG. 12b comes to an end and goes on with FIG. 12c.

Figure 12C:
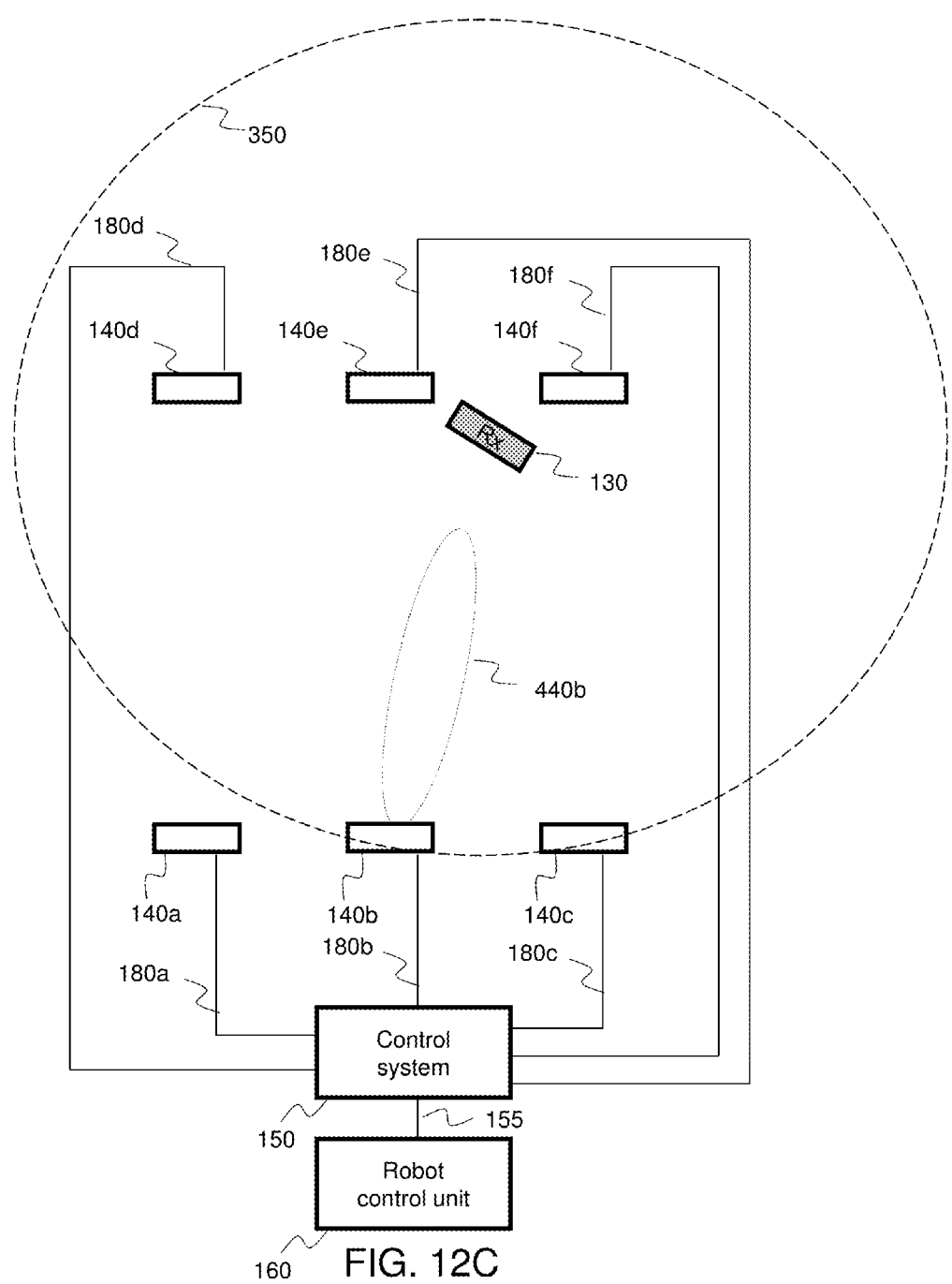
FIG. 12c illustrates the main elements of the communication network of FIG. 11, with the second node 140b transmitting directionally and first node 130 receiving omni-directionally.

FIG. 12c is similar to FIG. 12a and still concerns the start of the process (training sequence) for the antenna setup configuration. First node 130 has not yet received the first set of antenna coefficients and is still configured in omni-directional reception mode (reception area 350).

The first set of antenna coefficients is now communicated through link 180b to second node 140b for subsequent wireless transmission to first node 130 with beam 440b.

This transmission of the first set of antenna coefficients is performed with the antenna of second node 140b that has been previously configured for directional transmission towards the first node 130, as already explained above for second node 140a.

Figure 12D:
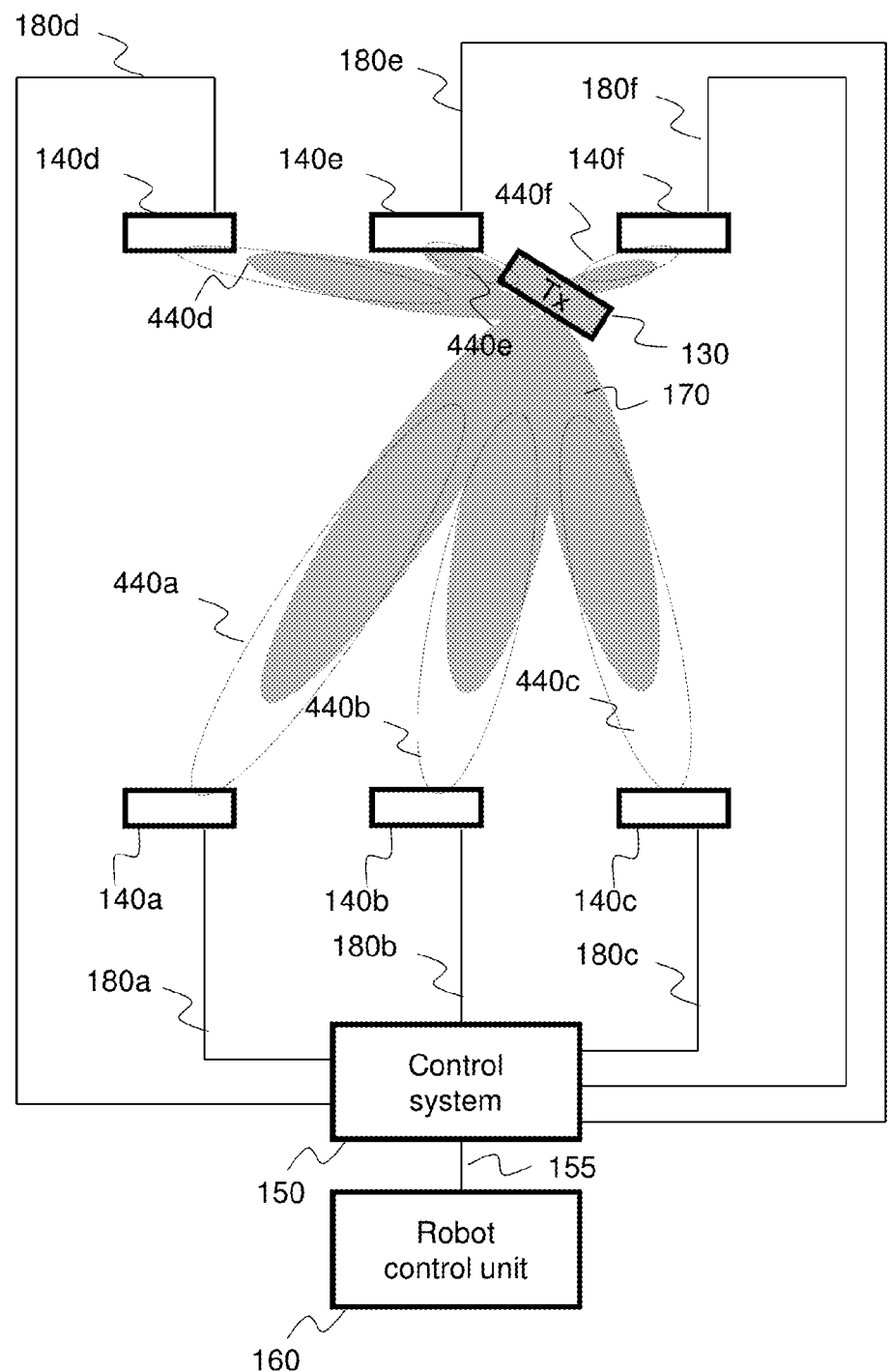
FIG. 12d illustrates the main elements of the communication network of FIG. 11, where first node 130 is transmitting in multi-directions and all the second nodes 140a, 140b, 140c, 140d, 140e and 140f are configured in directional reception mode towards the first node 130.

FIG. 12d illustrates the continuation of the configuration process (training sequence). Each of the second nodes 140a-f has its antenna oriented towards the first node 130 (as geometrically computed by control system 150 at the beginning of the new cycle) and is waiting for a response from first node 130.

The first node 130 has received the signal sent directionally in FIG. 12c through second node beam 440b. Thus, first node 130 can now obtain the "W" vector of coefficients, and configure its antenna array (multi-directional mode, beam 170) with this first set of antenna coefficients. First node antenna array is then ready for the transmission of a predetermined training signal towards all the second nodes 140a-f.

It has to be noted that the reception of the signal at some of the second nodes 140a, 140b, 140c, 140d, 140e, 140f might be disturbed due to problems like radio path shadowing.

Each second node 140a-f may take advantage of the signal reception from first node 130 to refine their directional antenna alignments. This can be achieved through some slight scanning around the initial geometric estimated position.

Each second node 140a-f measures the channel impulse response "H" if there is any received signal transmitted therethrough. H is a physical magnitude that represents the distortion caused by the channel to the signal transported by the latter. As already described with reference to FIG. 10a, the "$H^{-1}$" coefficients and the "y" symbol from each second node 140a-f having received the signal from first node 130 are provided to the control system 150.

After gathering or aggregating all the channel measurements from the second nodes 140a, 140b, 140c, 140d, 140e, 140f, the control system re-estimates or updates the "W" vector of coefficients (first set of coefficients) for the antenna array of the first node 130. In the current example, there is an obstacle between the second node 140a and the first node 130 so that the predetermined training signal emitted by first node 130 could not be received by second node 140a. Consequently, the re-estimated "W" vector of coefficients takes into account that the direct path between first node 130 and second node 140a is not possible.

Figure 13:
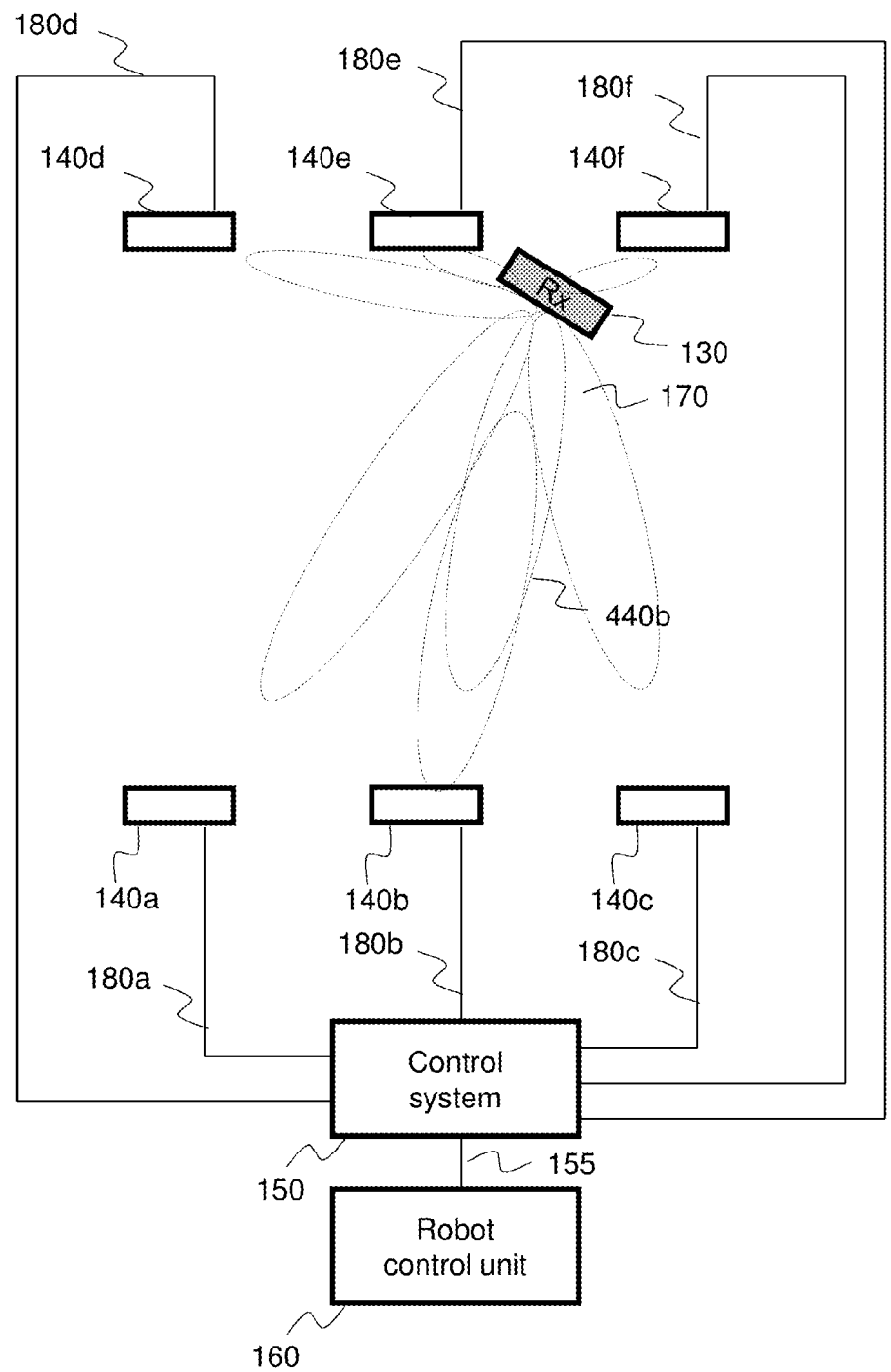
FIG. 13 illustrates the main elements of the communication network of FIG. 11, with the second node 140b transmitting directionally and first node 130 receiving in multi-directions.

In FIG. 13 the re-estimated or updated "W" vector of coefficients for the antenna array of the first node 130 (second set of antenna coefficients) is provided to first node 130.

After transmitting the predetermined training signal towards all the second nodes 140a-f (FIG. 12d), first node 130 is now configured in reception mode. The reception antenna coefficients of the first node 130 may be indifferently:

the "W" vector of coefficients or parameters already used for sending the predetermined training signal and based on the geometric computations and possibly a windowing method (first set of coefficients), or the coefficients or parameters allowing omni-directional antenna mode.

The re-estimated "W" vector of coefficients of the antenna array of the first node 130 is communicated through link 180b to second node 140b for subsequent wireless transmission to first node 130. This transmission of the second set of antenna coefficients is performed with the antenna of second node 140b that has been previously configured for directional transmission towards the first node 130. Second node 140b is used since it was successful for the transmission of the initial "W" vector of coefficients of the antenna of the first node 130 (first set of coefficients). Nevertheless, any of the other second nodes 140a, 140c, 140d, 140e, 140f could have been selected for this task provided that it correctly received the predetermined training signal from first node 130.

Now first node 130 can obtain the updated or re-estimated "W" vector of coefficients, and configure its antenna array (multi-directional mode, beam 170) with this second set of antenna coefficients. The first node antenna array thus configured is now ready for implementing any communication with the second nodes 140b, 140c, 140d, 140e and 140f until the end of the current communication cycle (so up to any action of the robot control unit to move its arms).

Figure 14:
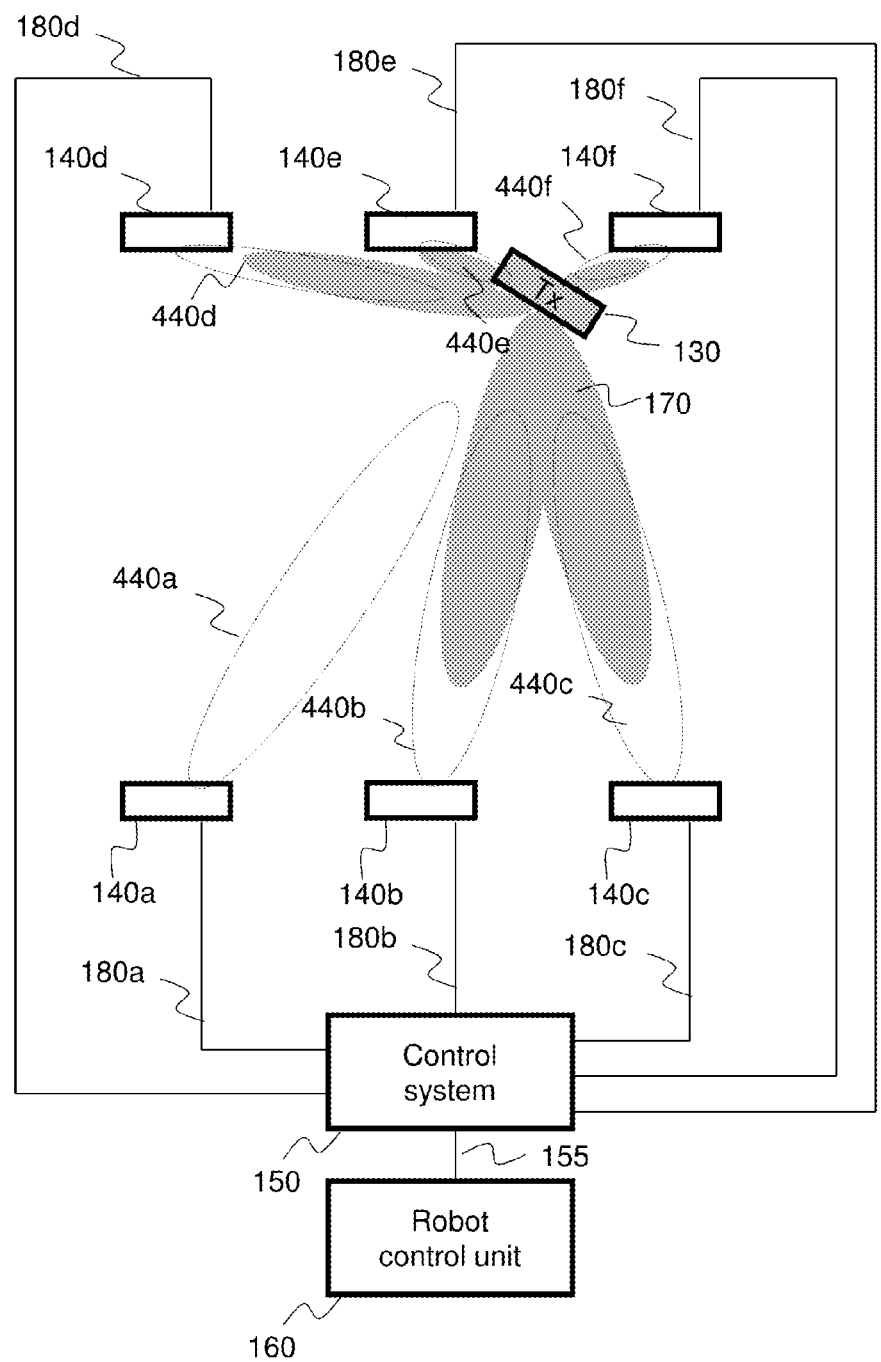
FIG. 14 illustrates the main elements of the communication network of FIG. 11, in case of operational communication of data with the first node 130 transmitting in multi-directions using its final "W" vector of coefficients for its antenna and all the second nodes 140a, 140b, 140c, 140d, 140e and 140f configured in directional reception mode towards first node 130.

FIG. 14 represents the main elements of the communication network of FIG. 11, in case of operational communication of data. The first node 130 is transmitting in multi-directions 170 using its final "W" vector of coefficients for its antenna array (second set of antenna coefficients). All the second nodes 140a, 140b, 140c, 140d, 140e and 140f are configured in directional reception mode towards the first node 130 with their respective beams 440a, 440b, 440c, 440d, 440f. It has to be noticed that the multi-directional beam 170 from the first node 130 has no beam towards the second node 140 a because it has been previously detected that this path is not valid. Thus, the final "W" vector has been computed considering it is useless to form from first node 130 a beam directed towards second node 140a.

On the second nodes side, it may be possible to forward to the robot control unit 160, through control system 150, only the data received by a selected node among the second nodes 140a-f. In case of incorrect reception by control system 150 from this selected node, it may advantageously be possible to select another second node. The only condition is that one of the second nodes 140a, 140b, 140c, 140d, 140e or 140f has to be able to forward to robot control unit 160 correct data.

Figure 15:
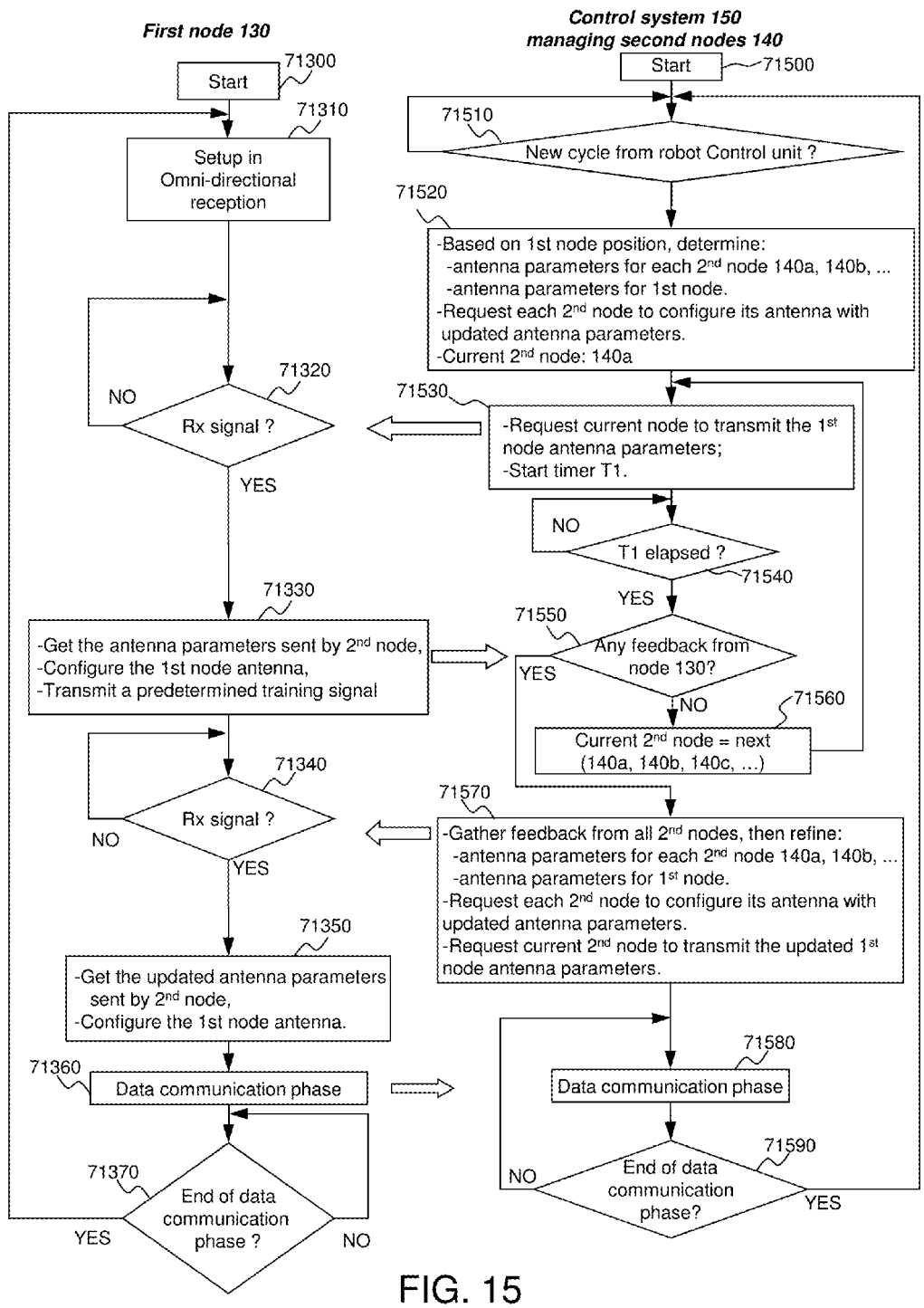
FIG. 15 is a flowchart representing the steps of a method for configuring nodes beam forming antennas according to a second embodiment of the invention.

Referring now to FIG. 15, a flowchart illustrates a method for configuring beam forming antennas in a network as shown in FIG. 9 according to a second embodiment of the invention.

This algorithm more particularly focuses on the different steps performed for adjusting the antenna configuration parameters used by first node 130 and second nodes 140a-f for multiple point-to-point transmissions.

To facilitate the reading of this flowchart, all the steps implemented by first node 130 and control system 150 managing the second nodes 140a-f are represented in one and the same figure. The configuration algorithm performed on the first node side is illustrated on the left hand side of FIG. 15 and that of the control system/second nodes side is represented on the right hand side of FIG. 15.

The steps 71300, 71500 respectively constitute steps of starting the algorithms of first node 130 and control system 150 and clearing all the parameters (initialization).

Then, the algorithm implemented on the first node side moves to step 71310 where it configures the first node 130 in omni-directional reception mode. Next, at step 71320, first node 130 is waiting for the reception of data which is to contain its "W" vector of coefficients of the antenna (first set of antenna coefficients). As soon as the data is received, the algorithm will move to next step 71330.

Once the algorithm has started, the control system 150 waits (step 71510) for information from robot control unit 160 indicating the beginning of a new cycle. In such a case, it means that robot control unit 160 has sent commands for moving its arm 110. Consequently, first node 130 which is associated to the image capture device will be given a new position and a new orientation.

During the following step 71520, robot control unit 160 provides to control system 150 the geometric or spatial coordinates of first node 130. Based on the first node coordinates and the known fixed coordinates of all the second nodes 140a-f, control system 150 estimates through geometric computation the antenna configuration parameters for each second node 140a-f, as well as the "W" vector of coefficients for the antenna array of first node 130 (first set of antenna coefficients). This computation is in accordance with the one depicted in FIG. 16 that will be described below.

Next, the control system 150 requests each second node 140a, 140b, 140c, 140d, 140e and 140f respectively through wired links 180a, 180b, 180c, 180d, 180e, 180f to configure its local antenna with the corresponding geometrically computed parameters. These parameters or coefficients allow these second nodes to be able to communicate directionally towards the first node 130. Before moving to step 71530, control system 150 decides to use second node 140a as current second node (selected second node).

In step 71530, system unit 150 commands the current second node to wirelessly transmit to first node 130 the "W" vector of coefficients for its antenna array. Then, the system unit 150 initializes a timer T1 with a pre-defined value, and configures all second nodes 140a, 140b, 140c, 140d, 140e and 140f in reception mode with their antenna oriented towards first node 130 (thanks to the geometrically computed antenna parameters).

Next, at step 71540, a check of the timer T1 is performed. As long as T1 has not elapsed the process remains at step 71540. When the timer T1 has expired then the process can move to the next step.

In step 71550, the control system 150 checks whether at least one of the second nodes 140a, 140b, 140c, 140d, 140e and 140f is receiving a predetermined training signal. In case of negative result, the control system 150 replaces the current second node by another second node which has not yet already been used in the current cycle.

Then, step 71530 is carried out again so that the wireless transmission by the current second node of the "W" vector of coefficients for the first node 130 antenna array be performed.

Meanwhile, on the first node side, first node 130 obtains its "W" vector of antenna array coefficients from the wireless reception coming from one of the second nodes (step 71330). Then, it immediately configures its antenna from the omni-directional mode to the multi-directional mode corresponding to the received "W" vector (first set of antenna coefficients). Thanks to this new antenna configuration the first node transmits over the air a predetermined training signal towards each second node 140a-f.

Next, in step 71340, the process of the first node 130 is waiting for the reception of information from one of the second nodes 140a, 140b, 140c, 140d, 140e or 140f.

Reverting to step 71550 (on the system side), if the result of the verification is positive, it means that a predetermined training sequence transmission from first node 130 is currently being performed. Each second node 140a, 140b, 140c, 140d, 140e or 140f receiving a signal may slightly tune its directional orientation around the initial value which has been geometrically computed.

At the following step 71570, the control system 150 gathers or aggregates all the feedbacks sent by the second nodes 140a, 140b, 140c, 140d, 140e and 140f. As already explained referring to FIG. 12d, the collected information are the "$H^{-1}$" coefficients and the "y" symbol from each second node. Based on this data, the control system 150 re-estimates or updates the antenna coefficients for the first node 130. As the computation is based on actual measurements, path shadowing is now taken into account in the configuration process. The control system provides the updated "W" vector of coefficients intended for the antenna array of the first node 130 (second set of coefficients) to the current second node.

Next, the control system 150 requests the current second node to send over the air the updated "W" vector of coefficients to the first node 130. The data communication phase will then be able to start from step 71580.

Meanwhile (on the first node side) at step 71340, the process of the first node 130 is waiting for reception of information from one of the second nodes. When the first node receives a wireless message from the current second node, the process jumps to step 71350.

During step 71350, first node 130 obtains its updated "W" vector of antenna array coefficients (second set of antenna coefficients). Then, it immediately configures its antenna to the multi-directional mode corresponding to the just received updated "W" vector, and the data communication phase can start from step 71360.

The data communication phase concerns both sides (steps 71360 and 71580) of the transmission network. A possible ARQ protocol which enables retrieving of data in case of incorrect multi-reception by all the second nodes may be implemented.

As soon as the first node has detected (step 71370) that the latest data from the image capture device has been wirelessly transmitted to the robot control unit through the second nodes, the current cycle is over. First node 130 process then goes back to step 71310 for a new cycle.

Simultaneously, the control system is also checking at step 71590 if the current cycle is still valid: this may be done by detecting the last data sent from the first node, or getting information from the robot control unit. If the current cycle is over, the process jumps to step 71510 already described above, waiting for starting a new cycle.

Figure 16A:
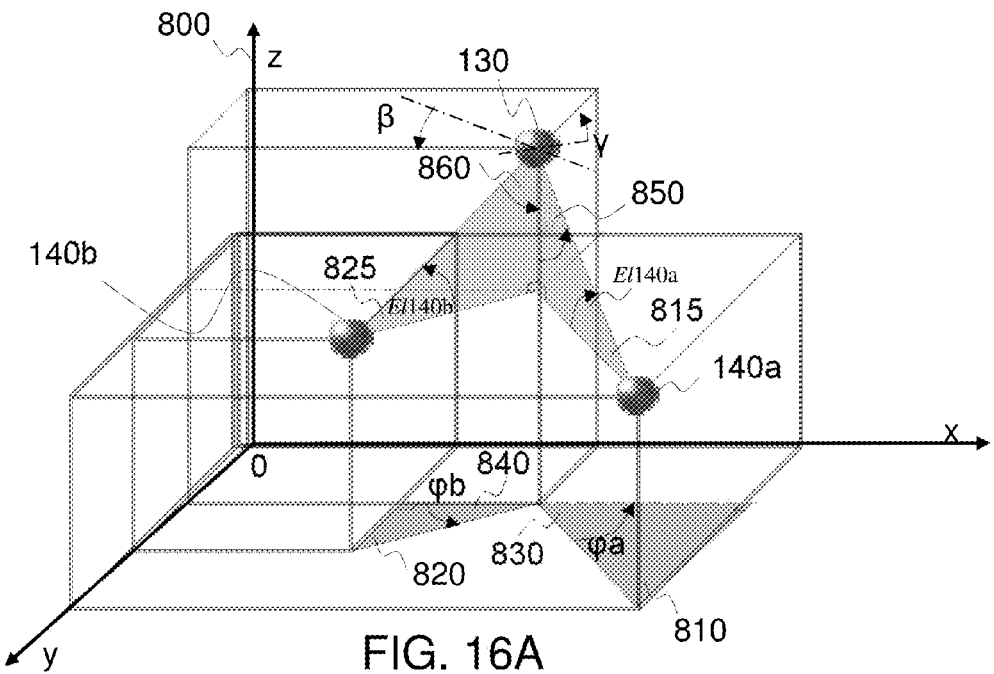
FIG. 16a represents the geometric position of two nodes in the network, and the associated coordinates.

FIG. 16a is a schematic drawing the aim of which is to explain how to geometrically compute the antenna parameters from the nodes coordinates (spatial positions).

FIG. 16a only represents first node 130 and second nodes 140a and 140b.

Since the second nodes are fixed, their coordinates are determined at the installation and then remain unchanged. By way of example, based on a common reference, the coordinates are as follows:

Node 140a: Xa, Ya, Za for the position and $\phi_0 a$ for the horizontal orientation, Node 140b: Xb, Yb, Zb for the position and $\phi_0 b$ for the horizontal orientation, Node 140c: Xc, Yc, Zc for the position and $\phi_0 c$ for the horizontal orientation, Node 140d: Xd, Yd, Zd for the position and $\phi_0 d$ for the horizontal orientation, Node 140e: Xe, Ye, Ze for the position and $\phi_0 e$ for the horizontal orientation, Node 140f: Xf, Yf, Zf for the position and $\phi_0 f$ for the horizontal orientation.

At the beginning of each robot cycle, robot control unit 160 provides the coordinates of first node 130 to the control system 150. These coordinates are based on the same common reference as for the second nodes: Xs, Ys, Zs (for the position) and β, γ for the orientation.

Figure 16B:
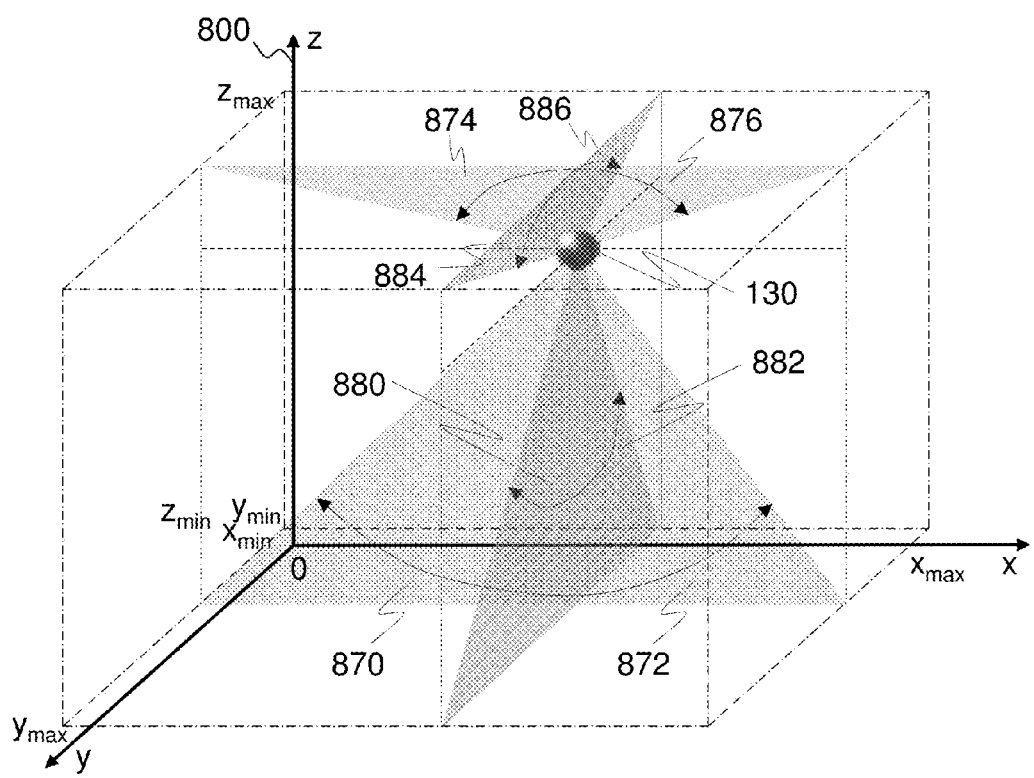
FIG. 16b shows the limits of the radiation with respect to the working area for the first node 130.

As the directional antenna of each second node has to be oriented towards the first node 130, these orientations have to match the following directions:

Second node 140a, Azimuth (810):
$Az140a = \phi_0 a - \arctan((Xa-Xs)/(Ya-Ys))$
and Elevation (815):
$El140a = \arctan((Zs-Za)/\sqrt{(Ya-Ys)^2+(Xa-Xs)^2})$
Second node 140b, Azimuth (820):
$Az140b = \phi_0 b - \arctan((Xb-Xs)/(Yb-Ys))$
and Elevation (825):
$El140b = \arctan((Zs-Zb)/\sqrt{(Yb-Ys)^2+(Xb-Xs)^2})$
Second node 140c, Azimuth:
$Az140c = \phi_0 c - \arctan((Xc-Xs)/(Yc-Ys))$
and Elevation:
$El140c = \arctan((Zs-Zc)/\sqrt{(Yc-Ys)^2+(Xc-Xs)^2})$
Second node 140d, Azimuth:
$Az140d = \phi_0 d - \arctan((Xd-Xs)/(Yd-Ys))$
and Elevation:
$El140d = \arctan((Zs-Zd)/\sqrt{(Yd-Ys)^2+(Xd-Xs)^2})$
Second node 140e, Azimuth:
$Az140e = \phi_0 e - \arctan((Xe-Xs)/(Ye-Ys))$
and Elevation:
$El140e = \arctan((Zs-Ze)/\sqrt{(Ye-Ys)^2+(Xe-Xs)^2})$
Second node 140f, Azimuth:
$Az140f = \phi_0 c - \arctan((Xf-Xs)/(Yf-Ys))$
and Elevation:
$El140f = \arctan((Zs-Zf)/\sqrt{(Yf-Ys)^2+(Xf-Xs)^2})$
For first node 130, there is a set of azimuth/elevation in relationship with each second node:

Azimuth towards second node 140a (830):
$Az130a = \beta - \arctan((Xa-Xs)/(Ya-Ys))$
Elevation towards second node 140a (850):
$E130a = \gamma - \arctan(\sqrt{(Ya-Ys^2+(Xa-Xs)^2)}/(Zs-Za))$
Azimuth towards second node 140b (840):
$Az130b = \beta - \arctan((Xb-Xs)/(Yb-Ys))$
Elevation towards second node 140b (860):
$El130b = \gamma - \arctan(\sqrt{(Yb-Ys)^2(Xb-Xs)^2}/(Zs-Zb))$
Azimuth towards second node 140c:
$Az130c = \beta - \arctan(\sqrt{(Xc-Xs)+(Yc-Ys)^2}/(Zs-Zc))$
Elevation towards second node 140c:
$El130c = \gamma - \arctan(\sqrt{(Yc-Ys)^2+(Xc-Xs)^2}/(Zs-Zc))$
Azimuth towards second node 140d:
$Az130\ d = \beta - \arctan((Xd-Xs)/(Yd-Ys))$
Elevation towards second node 140d:
$El130d = \gamma - \arctan(\sqrt{(Yd-Ys)^2+(Xd-Xs)^2}/(Zs-Zd))$
Azimuth towards second node 140e:
$Az130e = \gamma - \arctan((Xe\ Xs)/(Ye-Ys))$
Elevation towards second node 140e:
$El130e = \gamma - \arctan(\sqrt{(Ye-Ys)^2+(Xe-Xs)^2}/(Zs-Ze))$
Azimuth towards second node 140f:
$Az130f = \beta - \arctan((Xf-Xs)/(Yf-Ys))$
Elevation towards 140f:
$El130f = \gamma - \arctan(\sqrt{(Yf-Ys)^2+(Xf-Xs)^2}/(Zs-Zf))$ FIG. 16b shows the limits (windowing) of the radiation area for first node 130.

As already mentioned above, it may be necessary to reduce, or at most avoid, interferences that may occur with other adjacent systems. Consequently, the RF emitted radiations have to be limited to the working area bounded by Xmin and Xmax along the X axis. The corresponding angles are βminbot (870) and βmaxbot (872) for the radiation directed towards the bottom and βmintop (874) and βmaxtop (876) for the radiation directed towards the top of the robot, where:

βminbot=β−arctan((Xs−X min)/(Zs−Z min))
βmaxbot=β−arctan((X max−Xs)/(Zs−Z min))
βmintop=β+arctan((Xs−X min)/(Z max−Zs))
βmaxtop=β+arctan((X max−Xs)/(Z max−Zs))

On the y axis, the radiation has to be limited between Ymin and Ymax, and therefore the corresponding angles are γ minbot (882) and γmaxbot (880) for the radiation directed towards the bottom and γ mintop (884) and γmaxtop (886) for the radiation directed towards the top of the robot, where:

γminbot=γ−arctan((Ys−Y min)/(Zs−Z min))
γmaxbot=γ−arctan((Y max−Ys)/(Zs−Z min))
γmintop=γ+arctan((Ys−Y min)/(Z max−Zs))
γmaxtop=γ+arctan((Y max−Ys)/(Z max−Zs))

The computation of antenna coefficients from geometry will now be described in accordance with Godara method:

The Godara method is known to the person skilled in the art. Let us define $\hat{a}_\theta$ as the array vector with its N elements defined as exp(k.j.u) with $$u = \frac{\pi d}{\lambda}\sin\theta;$$

d is the distance from one element centre to the other, λ the wavelength, θ the angle to the antenna normal of the radiation. N is the number of antenna elements and k enumerates the different elements with respect to the symmetry of the antenna. W being the vector of antenna coefficients, the whole array output is given by y=W.$\hat{a}_\theta$. For each angle θ corresponding to a direction where the energy is wanted, y is desired to be one. For each angle θ corresponding to a direction where the energy is unwanted, y is desired to be zero. This therefore provides a set of conditions that can be defined by W.A=U, A being the N×N matrix of vectors $\hat{a}_\theta$, U being a vector of zeros and ones. W can be obtained by a pseudo inversion from A:

$W = U.A^H(A.A^H+\delta^2 I)^{-1}$ where I is the identity matrix and δ a small scalar.

By taking one angle for the elevation (El130*a*, El130*b*, ... ) and one for azimuth (Az130*a*, Az130*b*, ... ), and selecting a beam width, the vector Waz for azimuth and the vector Wel for elevation can be determined.

The resulting antenna patterns obtained in accordance with the above-mentioned method may then be windowed as described below.

However, the final computation of antenna coefficients will be described first.

This computation applies to Waz only, the vector for the azimuth. Wel, the vector for elevation, is calculated as above.

The computation is done based on the following elements:
"N" is the number of second nodes;
"W" is the vector of coefficients for the antenna array of the first node 130;
"Hi" is the impulse response of the radio channel measured at each second node; this vector has a dimension equal to the number of array elements of the transmission antenna;
"Yi" is a data received in the space of digital modulation, "s" being the corresponding transmitted data in the same space; the receiver may have an a priori knowledge of the s data. If not, it will select the symbol that is the closest to the received data;
"*" marks the conjugation, "H" is the Hermitian transform, and "T" is the transpose.

The equation 1 can be written as follows:

$$w = \frac{\sum_{i=1}^{N} y_i \cdot s^* \cdot (H_i^T)^H}{s \cdot s^* \cdot \sum_{i=1}^{N} (H_i^T)^H H_i^T}$$

In a preferred embodiment, but not necessarily, the symbol used to set the calculation must be known. For example, it is a symbol of a training sequence. This method is a directed computation since the receiver knows the transmitted sequence and, therefore, is able to perform the computation up to the optimum.

In the above formula, the impulse vector representing the radio channel must have the same dimension as the number of elements of the antenna array. If the equalizer has more cells than the number of elements of the antenna array, the $H^{-1}$ vector is built by truncating the vector of coefficients of the equalizer on both sides of the coefficient having the maximum level of energy.

Windowing of the antenna pattern:

The process of windowing is helpful to reduce or annihilate the radiation in the unwanted directions. This process is based on the use of windows reducing the unwanted side emissions. Several examples of such processes can be found in the prior art.

As known by the person skilled in the art, the capacity of producing a narrow beam is determined by the number of radiating elements of an antenna.

In a known manner, the antenna pattern or antenna factor is defined as $$AF = \sum_{n=1}^{T} w_n \cos((2n-1)u)$$

with T=N/2 or (N−1)/2 depending on N being odd or even, N is the number of elements of the antenna, $$u = \frac{\pi d}{\lambda}\sin\theta,$$

d is the distance from one element centre to the other, λ the wavelength and θ the azimuth angle to the antenna normal.

Figure 18:
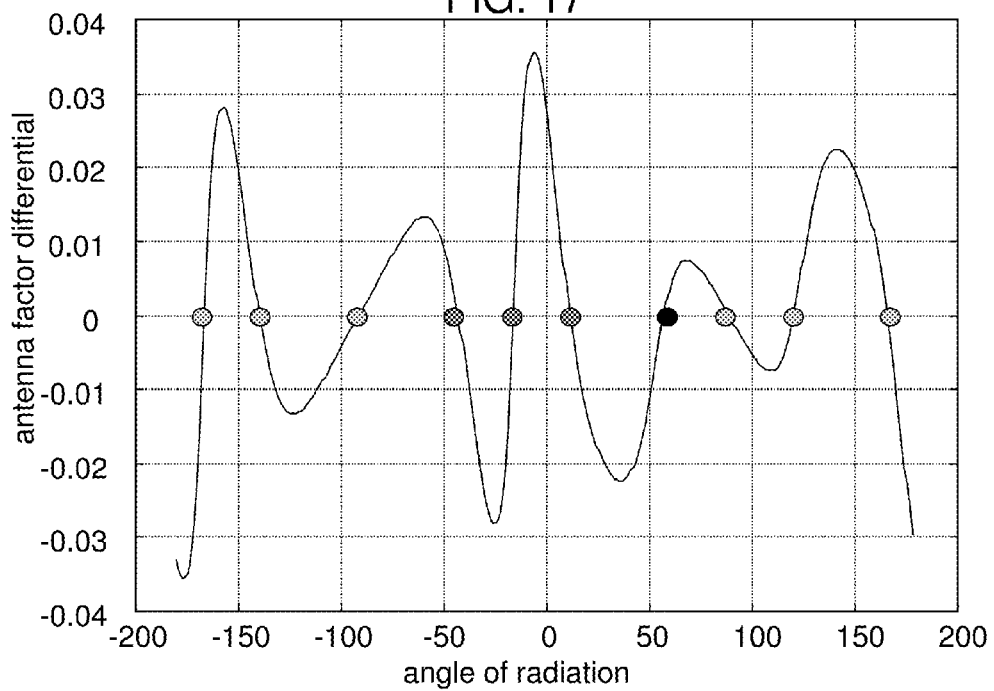
FIG. 18 represents the differentiation of an antenna factor.

The windowing process is based on the following operations:
carrying out a search for the maximum and minimum values of the antenna pattern created by the w coefficients obtained either through a geometric evaluation or through the feedback of second nodes;
elaborating the absolute value of the above defined antenna factor AF for each angle from −180 degrees to 180 degrees from the obtained w coefficients; it is easy to determine its maximum values, e.g. by differentiation, and by finding the angles for which the differentiated curve crosses the horizontal axis and equals to zero (FIG. 18);
then, the minimum or maximum value that is the closest to the end of the allowed window is determined;
for the radiation directed towards the bottom, the allowed window is defined respectively by βminbot and βmaxbot, γminbot and γmaxbot; for the radiation directed towards the top, the allowed window is defined respectively by βmintop and βmaxtop, γmintop and γmaxtop.

sampling the antenna factor at locations that are defined by the windowed beam (it is possible to collect the form of the requested AF);

next, applying a rotation to the windowed beam;

weighting the coefficients thus obtained by the amplitude of the samples of the requested antenna factor and adding these coefficients together.

Figure 17:
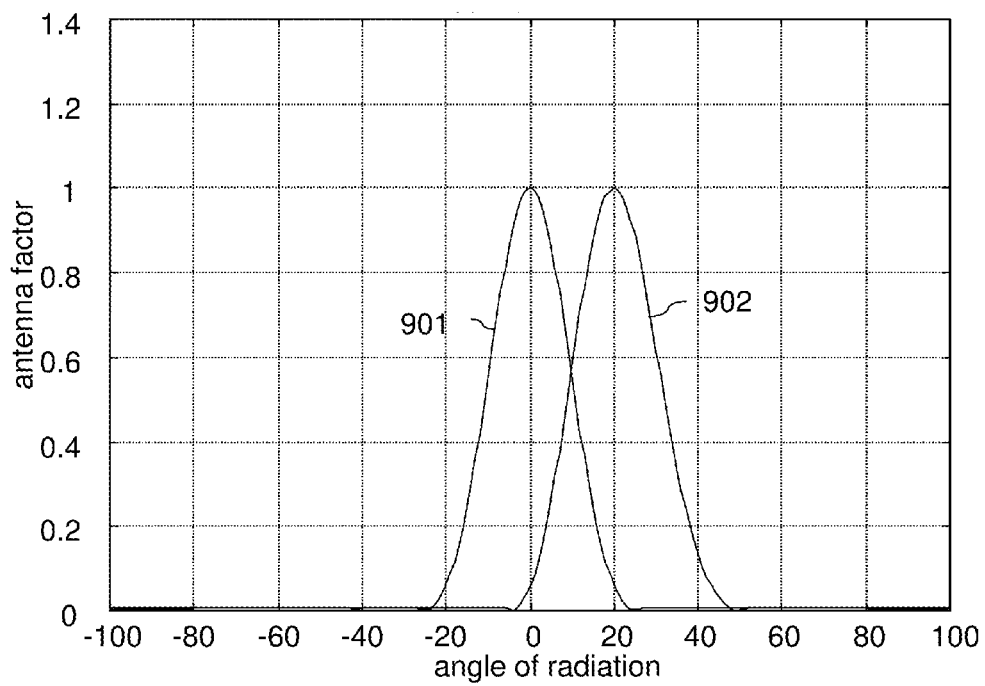
FIG. 17 shows two examples of an antenna factor generated by Chebytcheff windowing.

By way of example, if the antenna has 11 elements, it will be possible to design a beam with 20 degrees of width using a Chebycheff windowing providing giving the 11 coefficients: 0.0368, 0.1515, 0.3695, 0.6532, 0.9010, 1.0, 0.9010, 0.6532, 0.1515, 0.0368. The resulting antenna factor is shown in FIG. 17 by the curve 901. It is possible to rotate this beam by applying to each coefficient at position k the factor $\exp(j\pi \sin \theta_0 k)$, with $\theta_0$ being the rotation angle. The curve 902 in FIG. 17 illustrates the resulting antenna factor for a 20 degrees angle.

Figure 19:
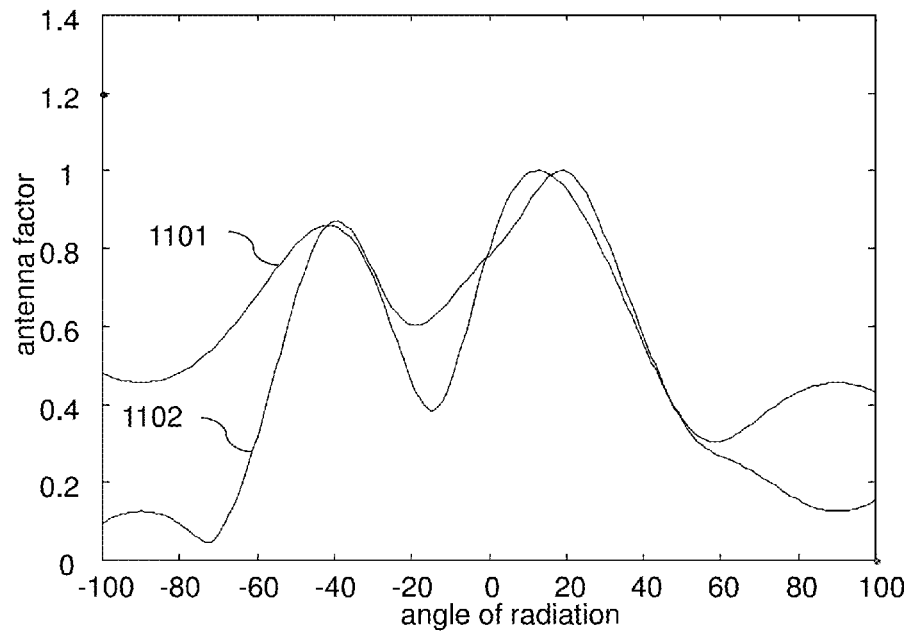
FIG. 19 represents a multi-beams antenna factor of the first node 130, before (1101) and after windowing (1102) to limit interferences outside the first node working area.

The coefficients obtained from above equation 1 are 0.0442+j0.0014, 0.0709-j0.246, 0.0242+j0.038, 0.432+j0.437, 0.0753+j0.0306, 0.0693+j0.0173, 0.0053+j0.0067 which leads to the antenna factor shown in FIG. 19 (curve 1101). It has to be noted that these coefficients are calculated using seven tap equalizers to determine the transfer function H.

The differentiation method already discussed above helps to determine that the curve has a minimum at 58 degrees. Given this angle and the Chebycheff windowed beam with a width of 20 degrees, six samples are necessary to cover the allowed zone from 60 degrees to −60 degrees. After rotating the coefficients providing the narrow beam with the 6 angles corresponding to the 6 samples, the coefficients are weighted by their amplitude and added together. The result is shown in FIG. 19 by curve 1102. Thus, the antenna factor reproduces the specified antenna factor in the angular region lying from −60 degrees to 60 degrees, and produces very limited energy outside this region.

In the above described embodiments, both the emitter and receiver have antenna arrays. One can therefore expect a multiplicity of paths and, not one, but many impulse responses.

In the examples given in FIGS. 5, 10a and 10b the antenna array has a non limitative number of four antenna elements (a different number of elements may alternatively be envisaged).

At the emitter the current is therefore divided between the four antenna elements and could be amplified and phased by the antenna coefficients denoted we. In the transmitter the signal is distributed to the four antenna elements. It is to be noted that X(t) represents the signal applied to the antenna elements.

At the receiver, all the signals coming from the four paths are added together, with the phasing and amplification that results from the antenna coefficients denoted wr.

Thus, a model can be established where the 4×4 HH matrix describes amplitudes and phases that are at an instant t applied to the signals out of the antenna array of the transmitter. X(t).we is a 4-element vector, but Y(t) is the addition of the elements of the 4-element vector resulting from X(t).we.HH(t).wr. Thus, Y(t) is a scalar.

If the coherence of the channel was adapted to the temporal dimension of every signal sent, the waveform of Y(t) would not need an equalizer and using the we and wr coefficients would be enough to obtain a perfect signal. At that point the impulse response of the channel would be equal to one, i.e. a vector like [0 0 1 0 0] where we would look at time samples 2 periods before and 2 periods after the arrival of a impulse. Here, if the bandwidth of the channel is not sufficient, there will necessarily be energy spread in the impulse vector. Moreover, if the paths are too long with respect to the sampling period, there will be interference between the symbols that the equalizer will correct. Interference may arise from paths which are too long between the antenna elements, and this phenomenon may even get amplified when reflections occur. It is true that if the directivity of the antenna is excellent and the bandwidth sufficient, the equalizer would be of no use and the measured impulse response would be one. Then, the above-mentioned equation 1 will take this into account and provide coefficients for the emitter mostly to point its antenna to the receiver excellent antenna.

The above embodiments have been described with an antenna array as an example of a beam forming antenna but other examples of beam forming antennas may be envisaged.

Figure 20:
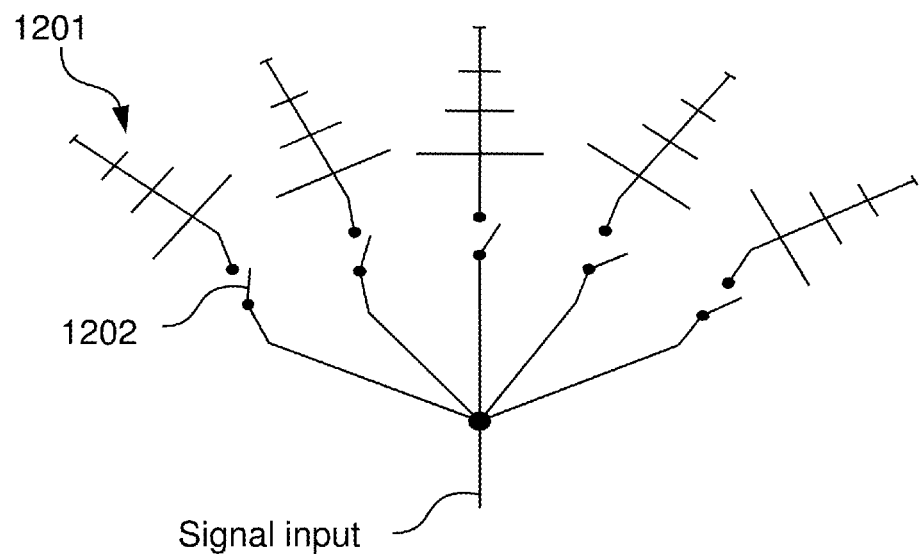
FIG. 20 represents another example of a beam forming antenna.

By way of example, the beam forming antenna may be made of sector antennas. Instead of forming beams based on the variation of coefficients applied to the amplitude and phase of the multiplicity of signals driving each an antenna element, beams are formed by applying the same signal through switches to antenna elements where the geometry of the antenna element defines the beam. In a non limitative example, a set of Yagi-Uda antennas as schematically illustrated in FIG. 20 is capable of creating a multiplicity of directional beams. Reference 1201 represents a four-element Yagi-Uda antenna, and reference 1202 is a switch. Each element will point respectively to −45 degree, −25 degree, 0 degree, +25 degree, +45 degree. However, since the beam is generated by the antenna elements geometry, the control is more often in 2 dimensions rather than in 3 dimensions, which implies that the robot control unit has to remain oriented if such antennas are used. In addition, it is impossible to control the energy other than by turning the antenna on or off, which means that the antenna coefficients for this kind of network are chosen in the set {0,1}.

In this case the process is based on the following operations:

searching for the minimum and the maximum values of the antenna factor AF created by the w coefficients as in the above-described preferred embodiment;

comparing these minimum and maximum values to the maximum of lobes that are predetermined by the antenna geometry, which therefore makes it possible to determine which antenna has to be turned on or off; the coefficients obtained here are 0 or 1, thereby indicating whether the energy is applied or not.

As an example the four-element Yagi antenna has a lobe of 50 degrees width.

According to their setting the lobes are not covering each other. The template AF of FIG. 19 may then be obtained by switching on the two antenna oriented at plus and minus 25 degree and by switching off the others. The antenna coefficients are thus [0,1,0,1,0]

Here, the Yagi Uda antenna has been used because of its high directivity and simplicity. Many others antenna factors could be obtained and used following the same principle.

The invention claimed is:

1. A method of configuring a beam forming antenna in a communication network that comprises a first node where the beam forming antenna is located, a plurality of second nodes and at least one destination node, communication links being established between said first node and said at least one destination node through at least some of said second nodes, characterized in that the method comprises:

obtaining a first set of antenna parameters so that the beam forming antenna configured with said first set of antenna parameters is prevented from emitting beams in directions other than towards the plurality of second nodes to which the signal is to be sent, emitting a signal by the beam forming antenna configured with the first set of antenna parameters, the signal being sent from the first node to several second nodes, obtaining, for a plurality of communication links through which the signal has been sent, at least one item of information representing distortion caused by each communication link to the signal, obtaining for each link of said plurality of communication links information representing energy received through said link, the at least one item of information and said information being two types of information characterizing each link of said plurality of communication links, aggregating said items of information of said plurality of communication links, obtaining a second set of antenna parameters for configuring the beam forming antenna in accordance with said aggregated items of information;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

2. The method of claim 1, characterized in that it comprises obtaining the first set of antenna parameters based on geometry of the first node and the plurality of second nodes to which the signal is to be sent so that the beam forming antenna is configured to simultaneously emit multiple directional beams towards said plurality of second nodes.

3. The method of claim 2, characterized in that obtaining said first set of antenna parameters is performed by said at least one destination node.

4. The method of claim 1, characterized in that it comprises sending said second set of antenna parameters to the first node through at least one second node.

5. The method of claim 1, characterized in that it comprises, performed by said at least one destination node, obtaining a third set of antenna parameters for a beam forming antenna located at each second node of the plurality of second nodes to which the signal is sent.

6. The method of claim 5, characterized in that it comprises sending the third set of antenna parameters to each second node of the plurality of second nodes.

7. The method of claim 1, characterized in that each communication link of the plurality of communication links is a wireless link.

8. The method of claim 1, characterized in that each communication link of the plurality of communication links is established between the first node and the plurality of second nodes.

9. The method of claim 8, characterized in that it comprises sending said at least one item of information obtained for each communication link of the plurality of communication links from each node of the plurality of second nodes to said at least one destination node.

10. The method of claim 1, characterized in that the plurality of second nodes is linked to said at least one destination node through wired links.

11. The method of claim 1, characterized in that the network is a mesh network and each communication link of the plurality of communication links is established between a plurality of second nodes relaying each the signal sent from the first node according to various paths in the mesh network and said at least one destination node.

12. The method of claim 1, characterized in that obtaining the two types of information for each link is performed by said at least one destination node.

13. The method of claim 1, characterized in that it comprises transmission, from said at least one destination node to the first node, of the two types of information obtained.

14. The method of claim 13, characterized in that it comprises the transmission of a return signal that comprises several separate information fields, the two types of information being respectively in at least two distinct fields.

15. The method according to claim 14, characterized in that the return signal comprises a field for detecting, on reception of the signal by the first node, of any errors that occurred during transmission.

16. The method of claim 1, characterized in that closed-loop configuration of the beam forming antenna is performed according to the two types of information obtained for each link of said plurality of communication links established on various paths in a mesh network.

17. The method of claim 1, characterized in that it comprises, at the first node, verification of presence or absence of a return signal coming from said at least one destination node.

18. The method of claim 17, characterized in that, in the case of absence of a return signal from said at least one destination node, configuration of the beam forming antenna takes into account information contained in last return signal received from this node.

19. The method of claim 1, characterized in that the network is a mesh network that comprises at least one relay node of a Decode Encode and Forward (DEF) type that decodes the signal received in coded form, re-encodes and transmits it to one or more other nodes in the network.

20. The method of claim 1, characterized in that the network is a mesh network that comprises at least one relay node of Amplify and Forward (AF) type that amplifies and transmits the signal received to one or more other nodes in the network.

21. The method of claim 1, characterized in that the beam forming antenna is an antenna array.

22. The method of claim 1, wherein the aggregating of the items of information of the plurality of communication links is performed by the at least one destination node.

23. A method of configuring a beam forming antenna in a communication network that comprises a first node where the beam forming antenna is located, second nodes and at least one destination node, communication links being established between said first node and said at least one destination node through at least some of said second nodes, characterized in that the method performed at said at least one destination node comprises:

obtaining a first set of parameters so that the beam forming antenna configured with said first set of parameters is prevented from emitting beams in directions other than towards the plurality of second nodes to which the signal is to be sent, receiving a plurality of items of information representing each distortion caused by a communication link to a signal which has been emitted by the beam forming antenna configured with the first set of parameters and sent through said communication link, aggregating said items of information of a plurality of communication links, obtaining for each link of said plurality of communication links information representing energy received through said link, the at least one item of information and said information being two types of information characterizing each link of said plurality of communication links, obtaining a second set of antenna parameters for configuring the beam forming antenna in accordance with said aggregated items of information, wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

24. The method of claim 23, characterized in that it comprises obtaining the first set of antenna parameters based on geometry of the first node and a plurality of second nodes to which the signal is to be sent so that the beam forming antenna is configured to simultaneously emit multiple directional beams towards said plurality of second nodes.

25. The method of claim 23, characterized in that it comprises sending said obtained set of antenna parameters to the first node through at least one second node.

26. A method of configuring a beam forming antenna in a communication network that comprises a first node where the beam forming antenna is located, second nodes and at least one destination node, communication links being established between said first node and said at least one destination node through at least some of said second nodes, characterized in that the method performed at said at least one destination node comprises:

obtaining a first set of parameters so that the beam forming antenna configured with said first set of parameters is prevented from emitting beams in directions other than towards the plurality of second nodes to which the signal is to be sent, obtaining, for a plurality of communication links through which a signal which has been emitted by the beam forming antenna configured with the first set of parameters has been sent, at least one item of information representing distortion caused by each communication to the signal;

obtaining for each link of said plurality of communication links information representing energy received through said link, the at least one item of information and said information being two types of information characterizing each link of said plurality of communication links, aggregating said items of information of said plurality of communication links for obtaining a second set of antenna parameters for configuring the beam forming antenna in accordance with said aggregated items of information;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

27. The method of claim 26, characterized in that it further comprises obtaining said second set of antenna parameters.

28. The method of claim 27, characterized in that it comprises sending said obtained set of antenna parameters to the first node through at least one second node.

29. A method of configuring a beam forming antenna in a communication network that comprises a first node where the beam forming antenna is located, second nodes and at least one destination node, communication links being established between said first node and said at least one destination node through at least some of said second nodes, characterized in that the method performed at said first node comprises:

obtaining a first set of antenna parameters so that the beam forming antenna configured with said first set of antenna parameters is prevented from emitting beams in directions other than towards the plurality of second nodes to which the signal is to be sent, emitting a signal by the beam forming antenna configured with the first set of antenna parameters, the signal being sent from the first node to several second nodes, obtaining a second set of antenna parameters in accordance with a plurality of items of information that have been previously aggregated, each item of information representing distortion caused by a communication link to the signal which has been sent through said communication link, obtaining for each link of said communication links information representing energy received through said link, the at least one item of information and said information being two types of information characterizing each link of said communication links, configuring the beam forming antenna with said obtained second set of antenna parameters;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

30. The method of claim 29, characterized in that prior to emitting the signal the method comprises receiving the first set of antenna parameters for configuring the beam forming antenna.

31. The method of claim 30, characterized in that no signal is sent by the beam forming antenna until the first set of antenna parameters is received.

32. The method of claim 30, characterized in that receiving the first set of antenna parameters is performed with the beam forming antenna configured in an omni-directional reception mode.

33. The method of claim 29, characterized in that the first set of antenna parameters is based on geometry of the first node and a plurality of second nodes to which the signal is to be sent so that the beam forming antenna is configured to simultaneously emit multiple directional beams towards said plurality of second nodes.

34. The method of claim 29, characterized in that it comprises receiving a set of antenna parameters for configuring the beam forming antenna through at least one second node.

35. A system for configuring a beam forming antenna in a communication network that comprises a first node where the beam forming antenna is located, second nodes and at least one destination node, communication links being established between said first node and said at least one destination node through at least some of said second nodes, characterized in that the system comprises:
  means for obtaining a first set of antenna parameters so that the beam forming antenna configured with said first set of antenna parameters is prevented from emitting beams in directions other than towards the plurality of second nodes to which the signal is to be sent,
  means for emitting a signal by the beam forming antenna configured with the first set of antenna parameters, the signal being sent from the first node to several second nodes,
  means for obtaining, for a plurality of communication links through which the signal has been sent, at least one item of information representing distortion caused by each communication link to the signal,
  means for obtaining for each link of said plurality of communication links information representing energy received through said link, the at least one item of information and said information being two types of information characterizing each link of said plurality of communication links,
  means for aggregating said items of information of said plurality of communication links,
  means for obtaining a second set of antenna parameters for configuring the beam forming antenna in accordance with said aggregated items of information;
  wherein aggregating the items of information of the plurality of communication links and obtaining the second set of antenna parameters are performed by the at least one destination node; and
  wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

36. A device for configuring a beam forming antenna in a communication network that comprises a first node where the beam forming antenna is located, second nodes and at least one destination node, communication links being established between said first node and said at least one destination node through at least some of said second nodes, characterized in that the device comprises:
  means for obtaining a first set of parameters so that the beam forming antenna configured with said first set of parameters is prevented from emitting beams in directions other than towards the plurality of second nodes to which the signal is to be sent,
  means for receiving a plurality of items of information representing each distortion caused by a communication link to a signal which has been emitted by the beam forming antenna configured with the first set of parameters and sent through said communication link,
  means for aggregating said items of information of a plurality of communication links,
  means for obtaining for each link of said plurality of communication links information representing energy received through said link, the at least one item of information and said information being two types of information characterizing each link of said plurality of communication links,
  means for obtaining a second set of antenna parameters for configuring the beam forming antenna in accordance with said aggregated items of information;
  wherein aggregating the items of information of the plurality of communication links and obtaining the second set of antenna parameters are performed by the at least one destination node; and
  wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

37. A device for configuring a beam forming antenna in a communication network that comprises a first node where the beam forming antenna is located, second nodes and at least one destination node, communication links being established between said first node and said at least one destination node through at least some of said second nodes, characterized in that the device comprises:
  means for obtaining a first set of parameters so that the beam forming antenna configured with said first set of parameters is prevented from emitting beams in directions other than towards the plurality of second nodes to which the signal is to be sent,
  means for obtaining, for a plurality of communication links through which a signal which has been emitted by the beam forming antenna configured with a first set of parameters has been sent, at least one item of information representing distortion caused by each communication to the signal;
  means for obtaining for each link of said plurality of communication links information representing energy received through said link, the at least one item of information and said information being two types of information characterizing each link of said plurality of communication links, means for aggregating said items of information of said plurality of communication links for obtaining a second set of antenna parameters for configuring the beam forming antenna in accordance with said aggregated items of information;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

38. A device for configuring a beam forming antenna in a communication network that comprises a first node where the beam forming antenna is located, second nodes and at least one destination node, communication links being established between said first node and said at least one destination node through at least some of said second nodes, characterized in that the device comprises:

means for obtaining a first set of antenna parameters so that the beam forming antenna configured with said first set of antenna parameters is prevented from emitting beams in directions other than towards the plurality of second nodes to which the signal is to be sent, means for emitting a signal by the beam forming antenna configured with the first set of antenna parameters, the signal being sent from the first node to several second nodes, means for obtaining for each link of said communication links information representing energy received through said link, the at least one item of information and said information being two types of information characterizing each link of said communication links, means for obtaining a second set of antenna parameters in accordance with a plurality of items of information that have been previously aggregated, each item of information representing distortion caused by a communication link to the signal which has been sent through said communication link, means for configuring the beam forming antenna with said obtained second set of antenna parameters;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

39. A method of configuring a beamforming antenna in a communication network that comprises a first node where the beam forming antenna is located, second nodes and at least one destination node, communication links being established between said first node and said at least one destination node through at least some of said second nodes, characterized in that the method comprises:

obtaining a first set of antenna parameters so that the beam forming antenna configured with said first set of antenna parameters is prevented from emitting beams in directions other than towards the plurality of second nodes to which the signal is to be sent, emitting a signal by the beam forming antenna configured with the first set of antenna parameters, the signal being sent from the first node to several second nodes, obtaining, for a plurality of communication links through which the signal has been sent, at least one item of information representing distortion caused by each communication link to the signal, wherein in the at least one item of information representing distortion caused by each communication link to the signal is a channel impulse response, obtaining for each link of said plurality of communication links information representing energy received through said link, the at least one item of information and said information being two types of information characterizing each link of said plurality of communication links, aggregating said items of information of said plurality of communication links, obtaining a second set of antenna parameters for configuring the beam forming antenna in accordance with said aggregated items of information;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

40. A method of configuring a beam forming antenna in a communication network that comprises a first node where the beam forming antenna is located, second nodes and at least one destination node, communication links being established between said first node and said at least one destination node through at least some of said second nodes, characterized in that the method comprises:

obtaining a first set of antenna parameters so that the beam forming antenna configured with said first set of antenna parameters is prevented from emitting beams in directions other than towards the plurality of second nodes to which the signal is to be sent, emitting a signal by the beam forming antenna configured with the first set of antenna parameters, the signal being sent from the first node to several second nodes, obtaining, for a plurality of communication links through which the signal has been sent, at least one item of information representing distortion caused by each communication link to the signal, wherein the at least one item of information representing the distortion caused by each communication link to the signal comprises:

a first type of information representing the communication link between a destination node and a relay node that relayed the signal to the destination node, and data of this signal that is received by the destination node via the communication link, and a second type of information representing the energy received by the destination node via the communication link, aggregating said items of information of said plurality of communication links, obtaining a second set of antenna parameters for configuring the beam forming antenna in accordance with said aggregated items of information;

wherein aggregating the items of information of the plurality of communication links and obtaining the second set of antenna parameters are performed by the at least one destination node; and wherein obtaining the second set of antenna parameters for configuration of the beam forming antenna comprises calculation of a vector of the antenna parameters that involves, a sum of information of a first type relating to the at least one item of information obtained for each link of said plurality of communication links established on the various paths, divided by a sum of information of a second type representing energy received through each link of said plurality of communication links.

* * * * *